United States Patent
Berg et al.

(10) Patent No.: US 9,042,251 B2
(45) Date of Patent: May 26, 2015

(54) PARAMETER PREDICTION FOR AUTONOMOUS DSL SYSTEM CONFIGURATION PROFILE SELECTION

(75) Inventors: Miguel Berg, Upplands Vasby (SE); Ramide Augusto Sales Dantas, Recife (BR); Daniel Cederholm, Solna (SE); Glauco Goncalves, Recife (BR); Rodolpho Guedino De Siqueira, Recife (BR); Rodrigo Perazzo Rabelo, Recife (BR); Djamel Sadok, Jaboatoa dos Guararapes (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 110 days.

(21) Appl. No.: 13/638,184

(22) PCT Filed: Apr. 1, 2010

(86) PCT No.: PCT/SE2010/000088
§ 371 (c)(1),
(2), (4) Date: Nov. 8, 2012

(87) PCT Pub. No.: WO2011/122997
PCT Pub. Date: Oct. 6, 2011

(65) Prior Publication Data
US 2013/0201844 A1    Aug. 8, 2013

(51) Int. Cl.
*H04L 1/00*    (2006.01)
*H04L 12/26*   (2006.01)
(Continued)

(52) U.S. Cl.
CPC ............ *H04L 43/04* (2013.01); *H04L 47/10* (2013.01); *H04L 1/0001* (2013.01);
(Continued)

(58) Field of Classification Search
CPC ..... H04L 43/04; H04L 1/0007; H04L 1/0009; H04L 1/0001; H04L 1/0071; H04B 3/32; H04B 1/68
See application file for complete search history.

(56) References Cited

U.S. PATENT DOCUMENTS 7,035,249 B2    4/2006   Christensen et al.
7,302,379 B2    11/2007  Cioffi et al.
(Continued)

FOREIGN PATENT DOCUMENTS

WO    2007008836 A2    1/2007
WO    2007120084 A1    10/2007
WO    2007130877 A2    11/2007

OTHER PUBLICATIONS

International Telecommunication Union, "Series G: Transmission Systems and Media, Digital Systems and Networks, Digital sections and digital line system—Access networks, Asymmetric digital subscriber line transceivers 2 (ADSL2)" G.992.3, Jan. 2005, 436 pages.

(Continued)

*Primary Examiner* — Edan Orgad
*Assistant Examiner* — Rebecca Song
(74) *Attorney, Agent, or Firm* — Rothwell, Figg, Ernst & Manbeck, P.C.

(57) ABSTRACT

Method and arrangement for predicting a parameter indicative of an achievable bit rate when using a certain configuration in a digital subscriber line. The method involves obtaining basic configuration parameters of a known configuration; selecting a candidate configuration; and deriving an estimated parameter, indicative of an achievable bit rate, based on the obtained and selected parameters.

28 Claims, 11 Drawing Sheets

(51) Int. Cl.
*H04L 12/801* (2013.01)
*H04L 12/24* (2006.01)

(52) U.S. Cl.
CPC ........... *H04L 1/0007* (2013.01); *H04L 1/0009* (2013.01); *H04L 1/0019* (2013.01); *H04L 1/0057* (2013.01); *H04L 1/0071* (2013.01); *H04L 41/083* (2013.01)

(56) References Cited

U.S. PATENT DOCUMENTS

| | | | |
|---|---|---|---|
| 7,315,573 B2 | 1/2008 | Lusky et al. | |
| 2003/0105997 A1* | 6/2003 | Mitlin et al. | 714/708 |
| 2005/0111561 A1 | 5/2005 | Sedarat et al. | |
| 2005/0207482 A1* | 9/2005 | Redfern | 375/222 |
| 2006/0198430 A1 | 9/2006 | Rhee et al. | |
| 2007/0195871 A1* | 8/2007 | Gulati et al. | 375/222 |
| 2009/0175199 A1* | 7/2009 | Trojer | 370/254 |
| 2011/0051906 A1* | 3/2011 | Cioffi et al. | 379/32.04 |

OTHER PUBLICATIONS

International Telecommunication Union, "Series G: Transmission Systems and Media, Digital Systems and Networks, Digital transmission systems—Digital Sections and digital line system—Access networks, Asymmetric digital subscriber line (ADSL transceivers", G.992.1, Jun. 1999, 256 pages.

International Telecommunication Union, "Series G: Transmission Systems and Media, Digital Systems and Networks, Digital sections and digital line system—Access networks, Asymmetric Digital Subscriber Line (ADSL) transceivers—Extended bandwidth ADSL2 (ADSL2+)", G.992.5, Jan. 2005 110 pages.

International Telecommunication Union, "Series G: Transmission Systems and Media, Digital Systems and Networks, Digital sections and digital line system—Access networks, Asymmetric Digital Subscriber Line (ADSL) transceivers—Extended bandwidth ADSL2 (ADSL2plus), Amendment 1", G.992.5, Amendment 1, Jul. 2005, 32 pages.

* cited by examiner

```
calc_beta (L, INPmin, maxDelay)
Rset = [0 2 4 6 8 10 12 14 16]
Dset = [1 2 4 8 16 32 64 128 256 511]
for R in Rset
  for D in Dset
    if (R*D produces a INP > INPmin)
      N = calc_N(L,R,D,INPmin,maxDelay)
      if (N is a positive number)
        store R,D,N
beta = the lowest R/N
return beta
```

Figure 11

```
calc_N (L, R, D, INPmin, maxDelay)
N = -1
if (FEC enabled)
    M = 256/D
    Bmin = (R/M)-1
    Bmax = ((Nmax-R)/M)-1
    Bset = Bmin to Bmax
    for B in Bset
       N' = (B+1)*M+R
       S = 8*N'/L
       mux_per_symbol = M/S
       if (N'*D <= memory limit)
          if (delay <= maxDelay)
             if (D <= 64)
                if (1/3 < S < 64)
                   the parameters are stored
             else if (D > 64)
                if (1/16 < S < 1/3)
                   if (3 < mux_per_symbol < 16)
                      the parameters are stored
    N = the average of the 25% largest Ns
else if (FEC disabled)
    N = (the number of bytes of L or 255 if L/8 >
255)
return N
```

Figure 12

PARAMETER PREDICTION FOR AUTONOMOUS DSL SYSTEM CONFIGURATION PROFILE SELECTION

CROSS-REFERENCE TO RELATED APPLICATION

This application is a 35 U.S.C. §371 National Phase Entry Application from PCT/SE2010/000088, filed Apr. 1, 2010, and designating the United States, the disclosure of which is incorporated by reference herein.

TECHNICAL FIELD

The invention relates to capacity aspects in the area of digital subscriber lines (DSL), and especially to prediction of parameters related to bit rate.

BACKGROUND

The demands on digital subscriber lines have increased over the recent years, due to the development and increased use of services involving video, voice and data. Such highly demanding services are also referred to as Triple Play (3P). For example, a 3P scenario may be a combination of VoIP (Voice over Internet Protocol), IPTV (Internet Protocol Tele-Vision) and high speed internet access. The provision of such 3P services is a challenging task in terms of Quality of Service (QoS). For example, parasitical effects in the physical layer, such as non-transient and transient noise, which until now have been negligible, suddenly have a considerable negative effect on the transport of services over the subscriber lines.

Impulse Noise Protection (INP) is one of the features available for interference mitigation in DSL technology. INP provides, as the name suggests, means to deal with non-stationary impulse-like noise patterns, by combining Forward Error Correction (FEC) and Interleaving, thereby enhancing the lines' ability to withstand impulse-like bursts of symbol errors. INP is measured in terms of amount of consecutive symbols protected. An example of impulse-like bursts 204b is illustrated in FIG. 2b, where the SNR margin is illustrated by the line 202b. INP is controlled by the parameters Minimum INP and Maximum Delay. Assigning high values to these parameters implies a higher protection against impulse noise, at the cost of lower data rates and longer delays to subscribers. A high value of max delay would typically result in a higher bit rate, since the modem then can use more interleaving instead of Reed-Solomon redundancy bits to achieve the configured INP.

Another method for reducing the effects of DSL line interference is the selection of an appropriate SNR margin. The SNR margin provides protection against longer periods of interference such as crosstalk, i.e. non-impulse like interference. An example of non-impulse-like bursts 204a is illustrated in FIG. 2a, where the SNR margin is illustrated by the line 202a. The SNR margin allows for extra protection against noise disturbance by inducing the modems to use more conservative modulation settings. The SNR margin is set in terms of a minimum SNR margin, a target SNR margin and a maximum SNR margin value. An increase of the SNR margin provides more protection but lower bit rates. Further, trellis coding is an available feature, which is frequently used to reduce noise effects in DSL systems.

The task of finding an adequate configuration with a proper setting of the INP and SNR margin is challenging, since different settings influence the line performance in terms of throughput and bit error rate, in a non-linear fashion. Theoretically, the choice of INP settings and SNR margin could be varied in an infinite number of ways. However, in order to keep the complexity of line management on a reasonable level, most operators limit the number of possible configurations by only allowing a certain number of predefined alternatives called configuration profiles. Each allowed profile comprises a certain INP setting, a certain target SNR margin and a maximum delay value. FIG. 1 shows a schematic view of an exemplary set of allowed configuration profiles 102 in the SNR-INP plane. The profiles in FIG. 1 are placed in a grid, which is, however, not necessary. The profiles could be defined in any constellation according to e.g. experience or preference.

The values in a configuration profile are threshold values, which may be used for configuring a DSL line. These set values are, however, not necessarily the same as the actual values after configuration, since the decision of, e.g., which actual e.g. FEC block length, redundancy and interleaver depth that should be used are made in the modems. This makes the task of finding an adequate configuration even harder, as compared to in systems like e.g. DOCSIS (Data Over Cable Service Interface Specification), i.e. broadband over coaxial cables, where parameters such as FEC block length, redundancy and interleaver depth are controllable, i.e. are imposed on the modems.

One approach currently employed by many telecom operators, in order to cope with disturbances in the DSL line, is to adopt default line protection settings, either optimistic or overprotective, and change these settings manually upon subscriber complaint. This approach has been reasonably suitable for traditional data services, such as pure best effort Internet services. However, for more demanding and sensitive services, such as IPTV, this approach is unlikely to scale. For example, subscribers of an IPTV service expect high-quality video delivery, having at least the same quality level as that of cable and satellite TV. Experience shows that even small disturbances in transmission are sufficient to cause perceivable video degradation. Thus, for many 3P services, using optimistic settings of INP and SNR margin will result in insufficient quality levels, while overprotective settings of INP and SNR margin will result in insufficient bit rates.

Different solutions for automatic adaption of a line configuration to current line conditions have been suggested. For example, a method for automatic line configuration adaptation is described in the patent document US2009/0175199 [6]. Document [6] concerns a solution to the problem of monitoring a DSL line and selecting transmission settings, i.e. a configuration profile, in order to maximize rate under varying noise environments. The method described in [6] involves trying, one at a time, in the event of performance degradation, a change in INP settings and a change in target SNR margin, evaluating the result of the respective tests, and selecting the alternative which gave the best result in terms of bit rate as the next line configuration. The performance degradation may be identified e.g. via thresholds on DSL error metrics.

Other examples of automatic line configuration adaptation are described in patent documents U.S. Pat. No. 7,302,379 [7], U.S. Pat. No. 7,315,573 [8] and U.S. Pat. No. 7,035,249 [9]. Document [7] addresses the problem of DSL line optimization in a broad sense, specifying statistics collection and analysis. Document [8] concerns a method for DOCSIS, where all information necessary for selecting an optimal next configuration is assumed to be available. U.S. Pat. No. 7,035, 249 [9] focuses on the timing of a reinitialization, i.e. reconfiguration, with an ambition to reduce the negative effects of a reinitialization by selecting the appropriate timing. The decision to make a reinitialization is made based on a comparison between current and historic monitored parameters.

One problem with automated line optimization solutions as the one suggested in [6], is that the different candidate line configurations need to be empirically tested in order to find a preferred candidate. For each candidate that is to be tested, the service on the line needs to be stopped and restarted in order to resynchronize the line. Each such resynchronization, or reconstruction, makes the line unavailable for tens of seconds up to minutes, depending on type of system etc. In some automatic systems, all predefined candidate configuration profiles are tested per default before selecting an appropriate configuration profile for use in reconfiguration.

The repeated interruption of the service on a line, due to resynchronizations during the search for a suitable candidate line configuration is thus identified as a problem.

SUMMARY

It would be desirable to improve the process of selecting a line configuration, which maximizes the achievable line bit rate. It is an object of the invention to facilitate the selection of an adequate candidate line configuration. Further, it is an object of the invention to provide a method an arrangement for predicting the achievable bit rate, or a parameter indicative of the achievable bit rate, given a certain candidate line configuration.

According to a first aspect, a method is provided for predicting a parameter indicative of an achievable bit rate when using a certain configuration in a digital subscriber line. Within the method, parameters associated with a known line configuration Ci are obtained. The obtained parameters are the DMT symbol size, an SNR margin and an INP parameter. The SNR margin may be either a target SNR margin or an actual SNR margin, and the INP parameter may be either a minimum INP or an actual INP, depending of which type of parameters that are to be used. Further, a candidate configuration is selected in form of a target SNR margin and/or a minimum INP. Then, an estimated parameter indicative of at least one of the DMT symbol size Li+1 and the achievable bit rate, Dr_i+1 is derived based on the obtained parameters and the selected candidate(s) for target SNR margin and/or minimum INP.

According to a second aspect, an arrangement is provided and adapted to predict a parameter indicative of an achievable bit rate when using a certain configuration in a digital subscriber line. The arrangement comprises a functional unit adapted to obtain certain parameters associated with a known configuration Ci. The parameters are the DMT symbol size, an SNR margin and an INP parameter. The SNR margin may be either a target SNR margin or an actual SNR margin, and the INP parameter may be either a minimum INP or an actual INP, depending of which type of parameters that are to be used. The arrangement further comprises a functional unit adapted to select a new candidate configuration Ci+1, by selecting a candidate for at least one of a target SNR margin and a minimum INP. The arrangement further comprises a functional unit adapted to derive an estimated parameter indicative of at least one of the DMT symbol size Li+1 and the achievable bit rate, Dr_i+1, based on the obtained parameters and the at least one selected candidate for target SNR margin and minimum INP.

The above described method and arrangement may be used for e.g. facilitating the choice of parameters for a next line configuration, since prediction of an achievable bit rate when using certain candidate parameters is enabled.

According to a third aspect, the method provided according to the first aspect is used in the selection of a next line configuration in a process of adapting a line configuration to current line conditions.

According to a forth aspect, an arrangement is provided and adapted to select a next line configuration in a process of adapting a line configuration to current line conditions where the arrangement is adapted to executing the method provided according to the first aspect.

The method and arrangement according to the third and fourth aspect may be used for reducing service interruptions for testing new line settings.

The above methods and arrangements may be implemented in different embodiments. The estimated parameter may be one of the DMT symbol size Li+1 and the achievable bit rate, $Dr_{i+}1$. Each INP value may be associated with a respective predefined coding gain value, $\gamma c$. The estimated DMT symbol size L for a certain configuration may be calculated based on the number of subcarriers on the line; the coding gain associated with the minimum or actual INP of a configuration; the actual or target SNR; the SNR per subcarrier k; and the desired bit error probability. The estimated DMT symbol size L for a certain configuration may further be estimated according to a certain formula.

Further, the estimated difference in DMT symbol size between a configuration Ci and a configuration Ci+1 is calculated based on the number of subcarriers on the line; the coding gain associated with the minimum or actual INP of a configuration; and the actual or target SNR. The difference could further be estimated according to a certain formula.

A forward error correction (FEC) block length N, a redundancy R and an interleaver depth D of a candidate configuration profile may be estimated by emulating modem behavior by applying a heuristic process taking the DMT symbol length Li+1, a minimum INP and a maximum delay as input. One goal of the heuristic process may be set to minimizing the interleaver depth.

A predicted achievable bit rate $Dr_{i+1}$, when using a certain configuration Ci+1 could be calculated based on the symbol rate, the DMT symbol size and a redundancy ratio. The achievable bit rate $Dr_{i+1}$, could further be estimated according to a certain formula.

The method and arrangement according to the first and second aspect may in some embodiments be used in a process of adapting a line configuration to current line conditions. These embodiments may further comprise obtaining information concerning current line conditions and determining whether the candidate line configuration fulfils certain requirements for use as a next line configuration, based on at least one of a predicted DMT symbol length and a predicted achievable bit rate. The information concerning line conditions may relate to current line conditions and/or historic line conditions.

Some embodiments may involve ranking of different candidate configurations, based on at least one of a predicted DMT symbol length and a predicted achievable bit rate. Some embodiments may involve providing information concerning at least one suitable, in terms of predicted achievable bit rate, candidate configuration to a unit, which is to perform a line reconfiguration based on said information. Some embodiments may involve selecting a suitable, in terms of predicted achievable bit rate, candidate configuration, and reconfiguring the line based on said selected candidate configuration.

The above embodiments have basically been described in terms of a method. However, the described arrangement has

BRIEF DESCRIPTION OF THE DRAWINGS

FIG. 11 shows an algorithm, Algorithm 1, in pseudo code, according to an embodiment.

FIG. 12 shows an algorithm, Algorithm 2, in pseudo code, according to an embodiment.

DETAILED DESCRIPTION

Briefly described, a method and an arrangement is provided, which enables prediction of the bit rate, directly or indirectly, which could be achieved by applying a certain candidate configuration profile in a DSL connection, even though only having access to the basic standard parameters, such as SNR margin and INP values, and the DMT symbol length, which are provided by most vendors of DSL services.

In the context of methods for automatic line configuration adaptation, the invention provides the means to estimate a maximum line data rate for a given candidate configuration, provided the current bit rate and line configuration are known. In addition to the use in DSL reconfiguration situations, the invention could be used e.g. in any context where the achievable line bit rate is valuable information.

SOME DEFINITIONS

Within this document, some expressions will be used when discussing the procedure of predicting a parameter indicative of an achievable bit rate, of which some will be briefly defined here.

Figure 1:
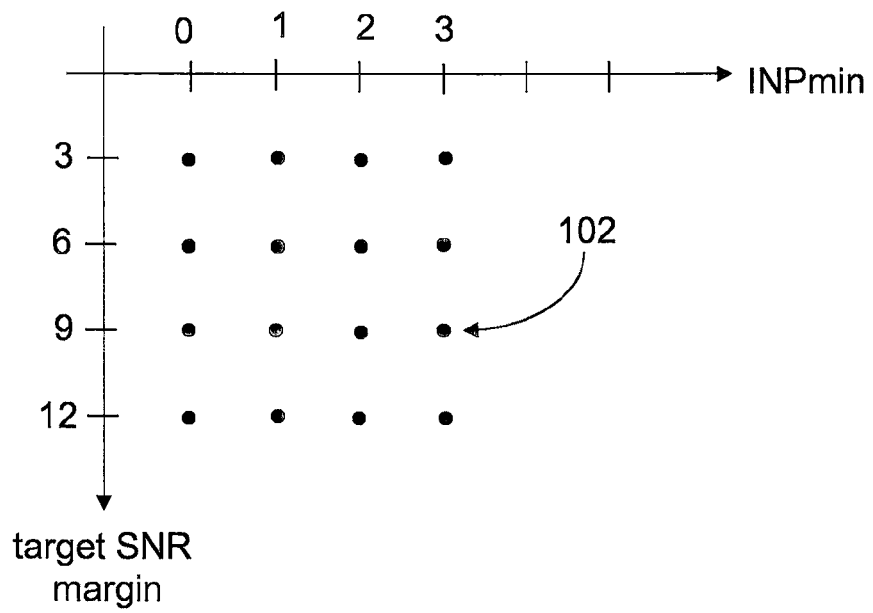
FIG. 1 is a schematic view illustrating an exemplary set of configuration profiles, according to the prior art.
Figure 2A:
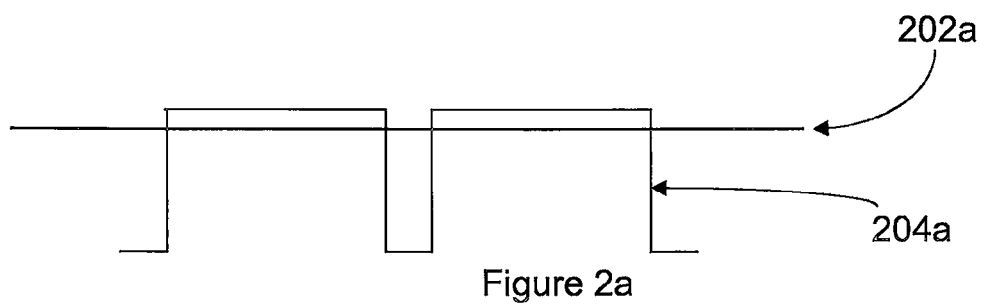
FIGS. 2a and 2b are schematic views illustrating different types of interference scenarios in a DSL line, according to the prior art.
Figure 2B:
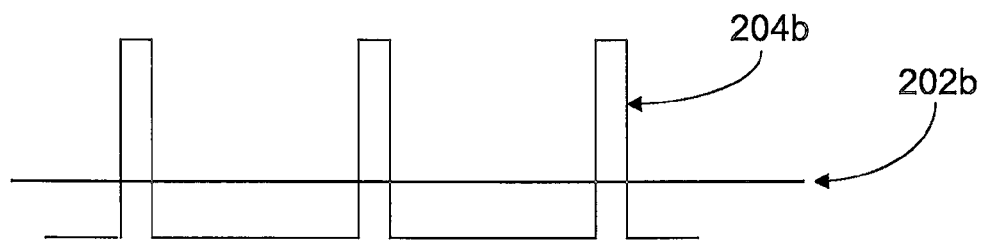

A "configuration profile" is a configuration among e.g. a set of predefined configuration profiles, which have been made selectable by an operator of DSL. The predefined configuration profiles comprise a target SNR margin, a minimum INP and a maximum delay, which could be used to configure a subscriber line. FIG. 1 illustrates an exemplary set of predefined configuration profiles.

The term "loaded" as in expressions like "loaded carrier" refers to when a subcarrier is used to convey one or more bits per symbol interval. A "fully loaded carrier" is a subcarrier, which convey the maximal allowed number of bits per symbol interval. For example, in ADSL, the maximal allowed number of bits per subcarrier and symbol interval is 15. Further, the terms "bit rate" and "data rate" are used interchangeably throughout this document.

The annotations "Y_i", "Yi" and "$Y_i$", as for example in INPmin_i, INPmini and $INPmin_i$, are used interchangeably.

Variables

A set of variables will be used in the following calculations. A list of the variables and a corresponding description of the variable is provided below, in order to facilitate the understanding of the equations.

minimum_INP or Minimum Impulse noise protection. Parameter of $INP_m$, configuration profile Target SNR margin Target Signal-to-Noise-Ratio margin. Parameter of configuration profile.

Dmax Maximum delay allowed in a subscriber link. Parameter of configuration profile.

Dr Data rate

L DMT symbol length [bits]

R Amount of redundant bytes per FEC codeword

N FEC codeword length [bytes]

β R/N=redundancy ratio. Typically, β<<1.

$b_k$ Number of bits per DMT tone/subcarrier $SNR_k$ SNR for tone/subcarrier k

Pe Desired bit error probability

Γ(Pe) Shannon gap for Pe

γc Coding gain [dB]

γm SNR margin

NSC Number of tones/subcarriers; where the carrier with index NSC corresponds to the Nyquist frequency and carries no data NSCUSED Number of tones/subcarriers with $b_k>0$ NSCONEBIT Number of tones/subcarriers with $b_k=1$ NSCinuse 0<$b_k$<maximal number of bits per tone/subcarrier D Interleaver Depth B Number of bytes per mux data frame received from upper layer M Number of mux data frames inside a FEC block S Number of DMT symbols per FEC block OR Overhead Rate K Constant, which equals M×D, which also equals the maximum interleaver depth implemented by the modem, in examples herein, K=256.

Only Basic Parameters Available

To a person, which is not well acquainted with DSL technology, it may appear as if all necessary parameters are available, and that it would only be to derive the achievable bit rate, if desired. Alas, this is not the case. On the contrary, different equipment and vendors of DSL services provide different DSL line metrics, and only a few very basic parameters could be depended on to be provided by most vendors. It is indeed not obvious how to predict an achievable bit rate of a candidate line configuration when only using these basic parameters.

Assumptions

In the calculations which will follow, some assumptions have been made. For example, it is assumed that the SNR will be the same for the known, e.g. current, configuration and a configuration for which a prediction is to be made. Further, in embodiments with access to information concerning bit loading, fully loaded carriers, i.e. carriers carrying the maximal number of information bits allowed by the standard, are omitted in the calculations. Further, it is assumed that a modem would try to minimize interleaver depth while meeting the INP constraint minimum_INP, and maximizing the rate. These assumptions will be described in more detail further below.

Prediction of DMT Symbol Length

The symbol rate is fixed in DSL communication, and may for example be 4000 symbols/second for a subscriber line. Thus, a prediction of the DMT symbol length is a rough indirect prediction of the achievable bit rate, i.e. the DMT symbol length could be said to be indicative of the achievable bit rate. For a better prediction of the achievable bit rate, the redundancy ratio β could also be estimated. In the following section, an example embodiment of the invention is shown, where a predicted DMT symbol length is calculated for an ADSL line. It should be noted that the invention is not limited to ADSL and could be used for VDSL2 and other systems with some modifications. Examples of such modifications for VDSL2 include using different ranges for some parameters and slight modifications to some formulas, which will be explained in more detail later.

$$Dr = 4 \times L \times (1-\beta) \, [\text{kbps}] \quad (1)$$

A rough estimate of the data rate, Dr, of an ADSL line can be obtained by the formula below, where "4" is related to the symbol rate 4000 symbols/s:

The number of bits per DMT tone $b_k$ can be estimated by the following formula, provided in [1]:

$$b_k = \log_2\left(\frac{SNR_k \cdot \gamma_c}{\Gamma(P_e) \cdot \gamma_m} + 1\right) \, [\text{bits}] \quad (2)$$

Given the number of bits per subcarrier $b_k$, k=1, 2, ..., NSC−1, the DMT symbol length L is obtained as being the sum of all $b_k$ over all NSC−1 subcarriers, as follows, when assuming no trellis coding:

$$L = \sum_{k=1}^{NSC-1} b_k = \sum_{k=1}^{NSC-1} \log_2\left(\frac{SNR_k \cdot \gamma_c}{\Gamma(Pe) \cdot \gamma_m} + 1\right) \, [\text{bits}] \quad (3)$$

When trellis coding is used, the sum of bits per subcarrier yields to the approximate symbol length L', which relates to the net symbol length L, i.e. without redundancy OR after trellis decoding, as shown below [3]:

$$L' = \sum_{k=1}^{NSC-1} b_k = L + \left\lceil \frac{NSCUSED - \frac{NSCONEBIT}{2}}{2} \right\rceil + 4 \, [\text{bits}] \quad (4)$$

In order to obtain more convenient formulations, the second part inside the logarithm in equation (3) is disregarded, i.e. it is assumed that the first part is much larger than 1, cf., $\log_2(2^6+1) \approx \log_2(2^6) = 6$, which provides the following approximation for L, assuming trellis coding is used:

$$L \cong \sum_{k=1}^{NSC-1} \log_2\left(\frac{SNR_k \cdot \gamma_c}{\Gamma(Pe) \cdot \gamma_m}\right) \, [\text{bits}] \quad (5)$$

Making use of the logarithm function properties and assuming the coding gain and SNR margin to be constant for all subcarriers, the following formula is obtained:

$$L \cong (NSC-1) \times \log_2(\gamma_c) - \quad (6)$$
$$(NSC-1) \times \log_2(\gamma_m) + \log_2\left(\prod_{k=1}^{NSC-1} \frac{SNR_k}{\Gamma(Pe)}\right) \, [\text{bits}]$$

Where L must fall within the constraint imposed by the minimum_INP configuration:

$$L \leq \frac{4 \times R \times D}{INP_{min}} \, [\text{bits}] \quad (7)$$

Further, the last term of equation (6) is assumed to remain constant between synchronizations, assuming relatively constant channel conditions, such as loop length, noise pattern, etc. Thus, the difference in DMT symbol length for two different line configurations, $L_i$ and $L_{i+1}$, under similar channel conditions, can be estimated as follows:

$$L_i - L_{i+1} \cong (NSC-1) \times \log_2\left(\frac{\gamma_{c_i}}{\gamma_{c_{i+1}}}\right) + (NSC-1) \times \log_2\left(\frac{\gamma_{m_{i+1}}}{\gamma_m}\right) \, [\text{bits}] \quad (8)$$

Figure 3A:
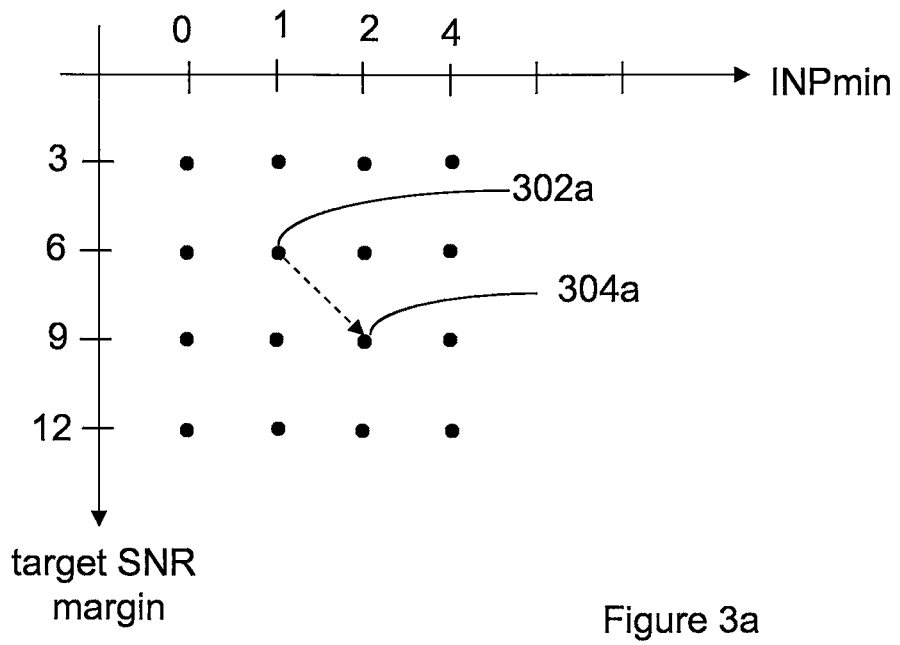
FIGS. 3a and 3b are schematic views illustrating a configuration profile, used for a current configuration, and configuration profiles, which are candidates for being used in a next configuration, according to the prior art.
Figure 3B:
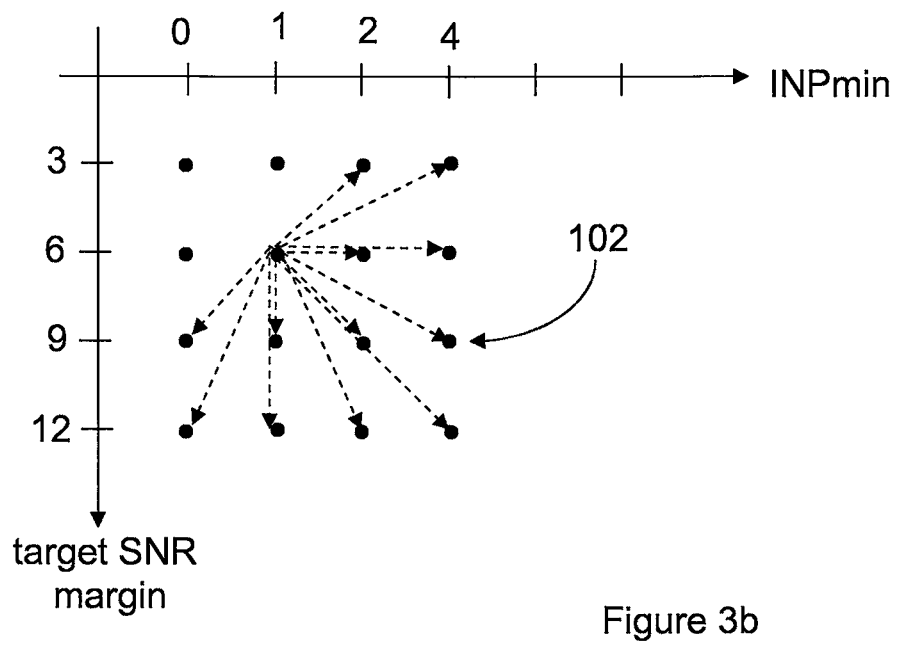

Consequently, when the values of $L_i$, $\gamma_{c_i}$ and $\gamma_{m_i}$ for a known line configuration Ci are known, it is possible to predict the DMT-symbol length $L_{i+1}$ of a candidate configuration Ci+1 once the values for the coding gain and the target SNR margin $\gamma_{mi+1}$ of the candidate line configuration Ci+1 are known. The coding gain can be derived from the minimum INP, which will be described in more detail later. The target SNR margin and the minimum INP are given for each configuration. For example, referring to FIG. 3a, the known configuration Ci may be the configuration profile 302a, and the candidate configuration Ci+1 may be the configuration profile 304a. The DMT-symbol length $L_{i+1}$ of the candidate configuration profile 304 could then be predicted using equation (8). The value for the coding gain may be derived from the INP-min_i+1 value of the candidate configuration profile 304a, and the target SNR margin value $\gamma_{mi+1}$ may be obtained directly from the candidate configuration profile 304a.

Thus, now a parameter $L_{i+1}$ is predicted, which is indicative of the achievable bit rate when using the configuration profile Ci+1. A predicted data rate for a candidate configuration Ci+1 could be estimated as follows:

$$Dr_{i+1} = 4 \times L_{i+1} \times (1-\beta_{i+1}) [kbps] \qquad (9)$$

To be able to predict the new data rate $Dr_{i+1}$, as stated in formula (9) above, the new value of β, i.e. $\beta_{i+1}$, which represents the amount of protection employed by the modem, is needed along with the estimated DMT symbol length $L_{i+1}$. Typically β is much smaller than 1 for reasonable combinations of INPmin and maximum delay. It was observed that overhead rate [3] usually remains almost unchanged between two configurations for the same channel conditions and since for higher bit rates it represents less than 1% of the final rate, for example, 32 Kbps on a 10 Mbps ADSL2 connection, it was not computed into the final model.

Prediction of INP, or Framing, Parameters

At configuration or reconfiguration, a modem receives a minimum INP constraint, i.e. INPmin, which has been previously mentioned. The way a DSL modem determines which protection parameters to employ, i.e., which FEC block length, redundancy and interleaver depth, given said minimum INP constraint is implementation dependent and not specified in standards. Since the selection of protection parameters is an optimization problem involving discrete quantities, there is no straightforward way to derive a closed formulation for all parameters. Instead, the selection of these parameters could be estimated by emulating modem behavior by applying a heuristic process.

As can be seen in equation (9), the lower the beta value, the higher the date rate. Thus, the heuristic's goal becomes to minimize beta. The process of estimating the protection parameters selected by a modem has been divided into two algorithms. The first algorithm estimates the lowest possible beta by searching over the redundancy R and the interleaver depth D, having the symbol length L as input, see algorithm 1, which is illustrated in pseudo code in FIG. 11. Algorithm 2, which is illustrated in pseudo code in FIG. 12, is invoked from algorithm 1 to calculate the FEC block size N such that N, R and D comply with ADSL2+ constraints [4] and of its amendments [5].

Given the minimum INP constraint that relates to the DMT symbol length L, the redundancy R and the interleaver depth D, algorithm 1 proceeds by evaluating values of R and D among a set of possible values. Here, exemplary sets of R and D taken from references [4] and [5] are used. For R: 0, 2, 4, 6, 8, 10, 12, 14 and 16; and for D: 1, 2, 4, 8, 16, 32, 64, 128, 256 and 511, different products of R and D are evaluated in search for the pair of values whose product is closest to, being either equal to or greater than, the minimum INP. In other words, the heuristic tries to find $R_{i+1}$ and $D_{i+1}$ so that:

$$\frac{4 \times R_{i+1} \times D_{i+1}}{L_{i+1}} \geq INP\min_{i+1} \qquad (10)$$

When more than one pair of values from the sets of possible R and D meet the minimum INP restriction, the heuristics assumes that the modem tries to minimize D, whose possible values grow exponentially, and instead allowing greater values for N within the maximum delay constraint. This heuristic is not applicable to cases where the minimum INP is set to zero.

Each pair of R and D evaluated in algorithm 1 is used iteratively as input to the second algorithm shown in FIG. 12, which returns a value of N associated with each pair, where N is the FEC codeword length. Then, the combination of R and N, which results in the lowest value of β, and thus the highest rate, is selected as the beta p expected to be selected by a modem.

The second algorithm illustrated in FIG. 12 performs an exhaustive search for the values of N for which the so called framing parameters, describing how bytes are grouped together for multiplexing and coding purposes, comply with the restrictions contained in the ADSL2+ standard [4] and Amendment 1 [5]. ADSL framing parameters, such as the number of mux data frames between sync octets, T; the number of mux data frames inside a FEC block, M; the number of DMT symbols per FEC block, S; and the Overhead Rate, OR, are directly related to N and the input parameters L, R, D, $INP_{min}$ and $Delay_{max}$.

According to ADSL standards, modems can be pre-configured to distribute input data into virtual channels, each one with distinct INP settings. These are mentioned in the standards as "latency paths", and the parameter B in formula (11) below is the portion of input data that will be transmitted in each path, usually with a different latency as the name suggests. However, ADSL2/+ modems usually implement only one latency path for cost reasons. The formulas are still valid for more than one latency path, but with minor changes. Assuming a modem that uses only one latency path, N can be obtained as:

$$N = (B+1) \times M + R_{[bytes]} \qquad (11)$$

where B is the number of bytes per mux data frame received from the upper layer. When analyzing the experiments, it could be observed that M is inversely proportional to D. One explanation for this is that, according to the standards, M mux data frames are scrambled inside a FEC block, which is interleaved depending on D, and as the interleaver memory is a limited resource, e.g. 16 kbytes shared by up- and downstream, the product of N and D may also be limited. Admitting this assumption as true, the product M×D equals a constant K, and thus:

$$M = \frac{K}{D} \qquad (12)$$

Figure 6:
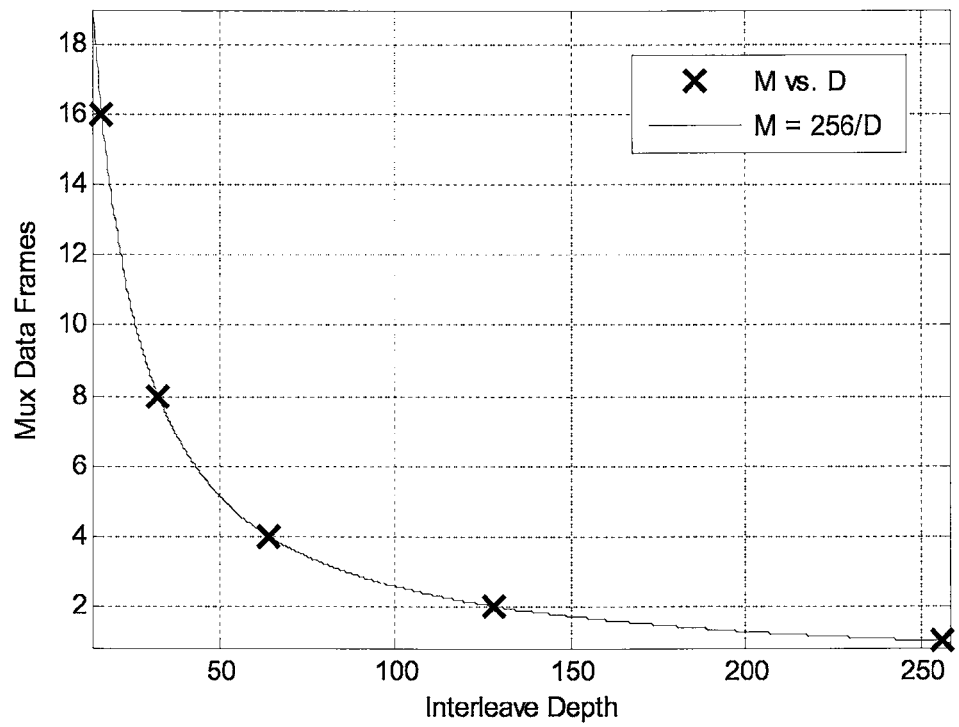
FIG. 6 is a diagram illustrating the relation between the number of mux data frames per FEC block, M, and the interleaver depth, D.

It was observed in laboratory experiments that the constant K is equal to the maximum interleaver depth identified; in the examples herein, K=256. In exceptional cases, constraints may allow N to be equal to 255, which is then selected by the modem; M is then set to 1, which leads to that the M×D heuristic fails. FIG. 6 shows a fitted curve employing the relation M=256/D plotted against data collected in the laboratory experiments.

Thus, N can be rewritten as:

$$N = (B+1) \times \left(\frac{256}{D}\right) + R \qquad (13)$$

In algorithm 2, the value of N is determined by searching over the space of possible values of B. These values can be derived using the theoretical minimum and maximum values of N. Assuming that the redundancy ratio is not greater than 50% and using the memory limitation assumption described above, the range of values of B is given by $[B_{min}, B_{max}]$, where:

$$B_{min} = \frac{R}{M} - 1 \quad (14)$$

$$B_{max} = \frac{(N_{max} - R)}{M} - 1 \quad (15)$$

Regarding the number of mux data frames between sync octets, T, it was observed that the modem tries to send 1 sync byte per DMT symbol, that is:

$$T = \frac{M}{S} \quad (16)$$

In practice, each value of N can produce two values of T: T=⌊M/S⌋ or T=⌈M/S⌉, depending on the modem implementation. Since the physical and framing layers are logically disjoint, the modem needs to make an approximation to achieve 1 sync byte per DMT symbol in average. The overhead rate, OR, can be calculated via (17) or (18):

$$OR = \left(\frac{M}{T \times S}\right) \times 32 \text{[kbps]} \quad (17)$$

$$OR = \left(\frac{M \times L}{T \times N}\right) \times 4 \text{[kbps]} \quad (18)$$

When combining the expression for T, without approximation, in (16) with the expression for the overhead rate, OR, in (17), OR can be expressed as:

$$OR = \left(\frac{M}{\frac{M}{S} \times S}\right) \times 32 \quad (19)$$

And consequently:

$$OR = 32 \text{ kbps} \quad (20)$$

This result suggests that OR does not depend on N. Thus, in the search for an appropriate N, the limits for T and OR do not need to be verified.

The parameter S can be obtained directly by the following expression:

$$S = \frac{8 \times N}{L} \quad (21)$$

Once one set of potential parameters, i.e. N and S for a certain B, is calculated in algorithm 2, a series of restrictions related to the standard are tested. When a set of calculated parameters passes through all of tests, the parameters are stored for future analysis. The restrictions are: (a) memory limitation, (b) maximum delay, (c) DMT symbols per FEC codeword, (d) mux data frames per DMT symbol. The restrictions (c) and (d) depend on the range of values in which D falls in. The range determines whether to use the ADSL2+ standard [4] or the Amendment 1 [5] constraints. The table below, reproduced from the amendment, shows the valid configurations for D, S and M. If D≤64, the valid values are those for any latency path #p; in case D>64, valid values are those related to the downstream latency path #0.

After filtering out parameter sets which do not comply with the restrictions, the algorithm selects the highest 25% of the possible values of N, and calculates the average of these values. These values, i.e. the highest 25% of the possible values of N, can be used to determine the theoretical lower and upper bounds for the estimated rate by using the minimum and maximum values of N in the expressions leading to a rate estimate.

The procedure of using the average value of a set comprising the highest 25% of the possible values of N showed to have the best results regarding N prediction. Simply using the highest value tends to overestimate the rate, while using the minimum value from the 25% highest, compensates for some imprecision in the prediction of L, resulting in better, but unrealistic, accuracy. It is worth noticing that framing and protection parameters are calculated based on the predicted L; the greater the error in the predicted L, the more likely R, D and N will be mistakenly selected.

Estimating Coding Gain

To estimate the coding gain γc due to Reed-Solomon coding, a series of experiments were conducted on a laboratory setup with ADSL2+ line and impairment emulation equipment. In the experiments, the difference in number of bits per subcarrier $b_k$ between experiments with different INP settings was measured. In order to facilitate the analysis, only AWGN scenarios were tested. However, the results showed to be valid also for other noise scenarios. Channel conditions where a few subcarriers reached the hard maximum number-of-bits-limit of 15 bits, which is established by the standards, were also preferred in the experiments. The estimated coding gain for INPmin values up to 4 was calculated as the mean value for the difference in bit allocation, which is equivalent to obtaining the expectancy of the bits added to each subcarrier. The values found for the coding gain expressed in bits, the linear ratio and dB, respectively, are shown in Table 1 below.

TABLE 1

Estimated Coding Gain for Different INPmin

| INPmin | Coding gain (bits) | Coding gain (Linear Ratio) | Coding Gain (dB) |
|---|---|---|---|
| 0 | 0 | 1.0000 | 0 |
| 0.5 | 0.6804 | 1.6026 | 2.0483 |
| 1 | 0.8441 | 1.7952 | 2.5411 |
| 2 | 0.9413 | 1.9203 | 2.8337 |
| 4 | 1.0254 | 2.0355 | 3.0867 |

Figure 7:
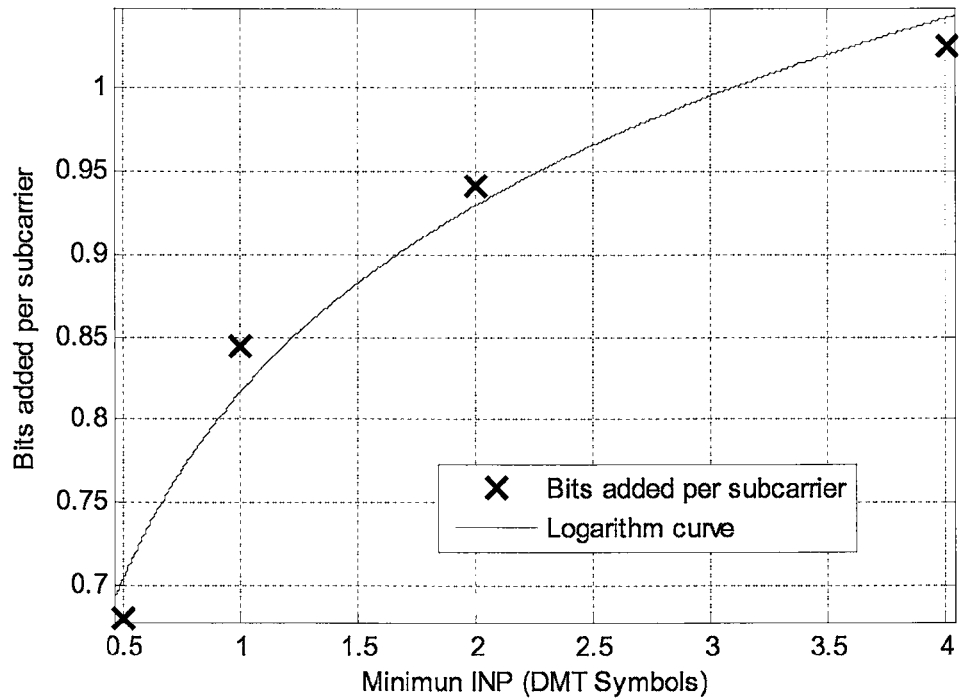
FIG. 7 is a diagram illustrating the relation between coding gain and minimum or actual INP.

The values in Table 1 showed to be logarithmically related to the minimum INP settings, except for INP=0. This can be seen in the graph of FIG. 7. Thus, this relation can be used for finding a coding gain associated with a certain minimum INP. The coding gains used e.g. in formula (8) are derived using this relation. These results could also be used for finding the coding gain associated with an actual INP value obtained from the line.

Downstream Rate Prediction

Using the bit allocation table of the current synchronization, it is possible to obtain the number of loaded subcarriers. Let $NSC_{inuse}$ be the number of loaded carriers, which renders formula (22) below, derived directly from (8):

$$L_i - L_{i+1} \cong (NSC_{inuse}) \times \log_2\left(\frac{\gamma_{c_i}}{\gamma_{c_{i+1}}}\right) + (NSC_{inuse}) \times \log_2\left(\frac{\gamma_{m_{i+1}}}{\gamma_m}\right) \text{[bits]} \quad (22)$$

Figure 8:
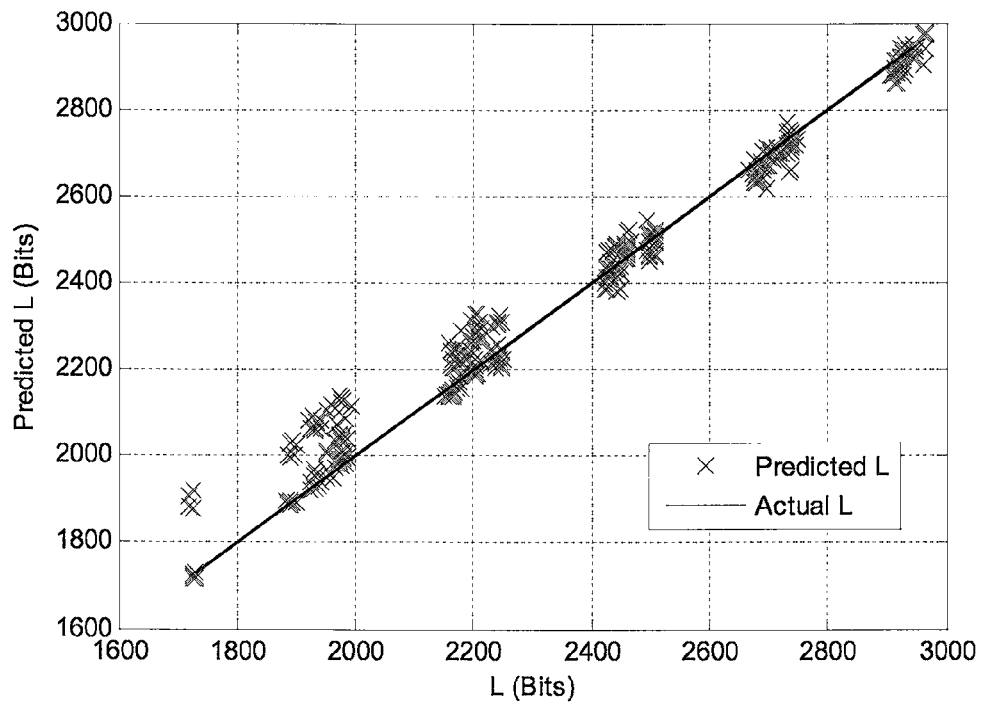
FIG. 8 is a diagram illustrating predicted and actual DMT symbol length, L, according to an embodiment.

A factor that prevents better prediction is that the number of carriers used is not necessarily constant between experiments with different settings. In fact, there is no guarantee for that the number of carriers used is constant even if the settings are kept unchanged. Since per-carrier SNR information is not necessarily provided by the DSLAM's (Digital Subscriber Line Access Multiplexer) management interface, it becomes difficult to predict how carriers are going to react to changes in margin and coding gain. For example, without information of the SNR per carrier, it cannot be accurately predicted if a fully loaded carrier, i.e. for which $b_k=15$, will lose bits when the SNR margin is increased, or vice-versa for unloaded carriers. An optimistic strategy to cope with this situation is to take into account in the calculations only the carriers which have more than 0 bits and less than, but not equal to, the hard limit of 15 bits. Therefore, $NSC_{inuse}$ becomes the number of carriers such that $0<b_k<15$, for k=1, 2, . . . , NSC−1. The reason for this is, e.g., that fully loaded carriers will not gain bits when the SNR margin is reduced. Further, for more protective configurations there may be room within the SNR margin for keeping a loading of 15 bits also after an increase of the SNR margin. The graph in FIG. 8 illustrates the described DMT symbol length prediction model's response for a 3000 m ADSL2+ loop; additional experiment parameters can be found in Table 2 below.

TABLE 2

Experiment Parameters

| Parameter | Values |
| --- | --- |
| Minimum INP | 0, 1, 2, 4 |
| SNR Margin | 3, 6, 9, 12, 15, 18 (dB) |
| Maximum Delay | 8 ms |
| Noise | Noise-less and 50 Hz REIN |
| Loop length | 1000, 2000, 3000 (m) |

In FIG. 8, it can be seen that for low values of L, the actual values of L are smaller than the predicted values of L, as a consequence of higher margins. Taking as an example the extreme case where the margin is 18 dB, which is the highest margin used in the experiments. In average, other configurations have more, or at least the same number of, fully loaded carriers. When moving from an SNR margin of 18 dB to an SNR margin of 15 dB, the model performs well by adding 1 bit in almost all carriers. In the opposite case, i.e. when moving from an SNR margin of 15 dB to an SNR margin of 18 dB, fewer carriers have 1 bit subtracted in the model than in the actual number in the experiment, thereby rendering the predicted L to be overestimated. For high values of L, which here correspond to cases using a 6 dB margin, the opposite phenomenon can be found, i.e. L is slightly underestimated.

Figure 9:
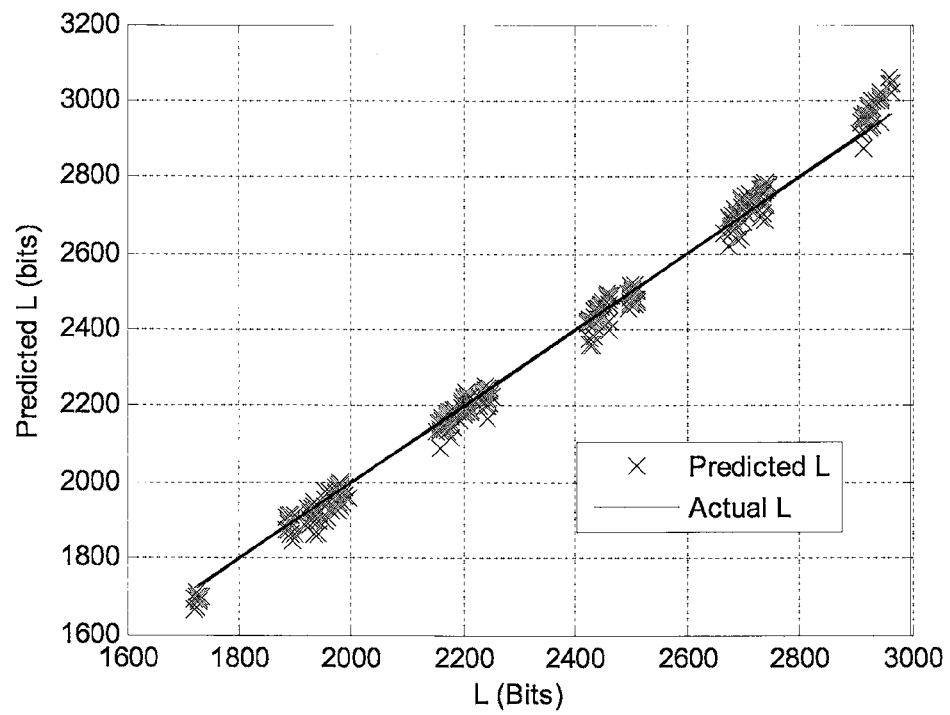
FIG. 9 is a diagram illustrating predicted and actual DMT symbol length, L, according to an embodiment.

The above mentioned problem of over- and underestimation of L could be addressed by using historical information, such as the average number of loaded carriers for a particular line during, e.g., a certain period of time. FIG. 9 illustrates the result of using this possible solution in the model. The graph in FIG. 9 shows the predicted L using the historical average number of loaded carriers in experiments for a 3000 m loop, AWGN scenario. As can be seen in FIG. 6, the accuracy of the predicted values is significantly improved, as compared to the result when not using historical values shown in FIG. 5. The average error fell below 1% when adding the historic information. This result suggests that the use of historical data, i.e. not only current settings and performance indicators, can lead to much better models.

Using the earlier described procedure to estimate beta, and the estimated coding gain values of Table 1, it is possible to predict the data rate of a candidate configuration by using formulas (22) and (23). Equation (9) is repeated below as (23) for sake of clarity.

$$Dr_{i+1}=4 \times L_{i+1} \times (1-\beta_{i+1})[kbps] \quad (23)$$

Figure 10:
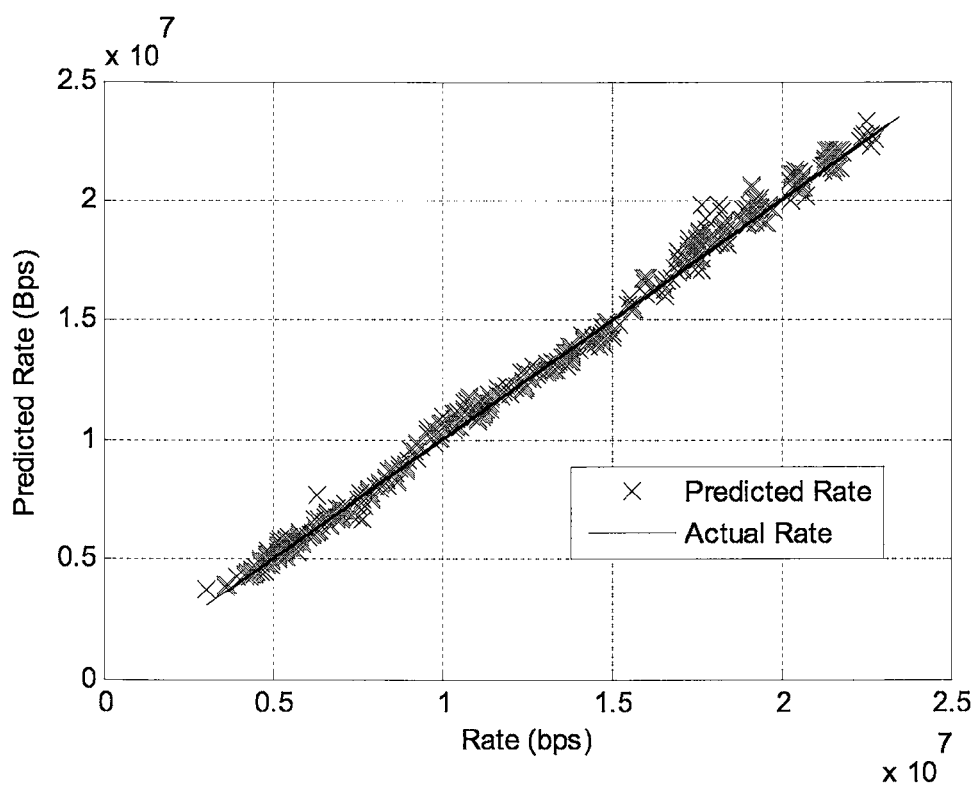
FIG. 10 is a diagram illustrating predicted and actual bit rate, Dr, according to an embodiment.

The described model yielded a 2.6% relative error when applied on a data set of random settings to predict the next experiment data rate using current experiment data rate. The loop length and noise profile were kept constant between the different settings. The result of this experiment is shown in FIG. 10.

Figure 13:
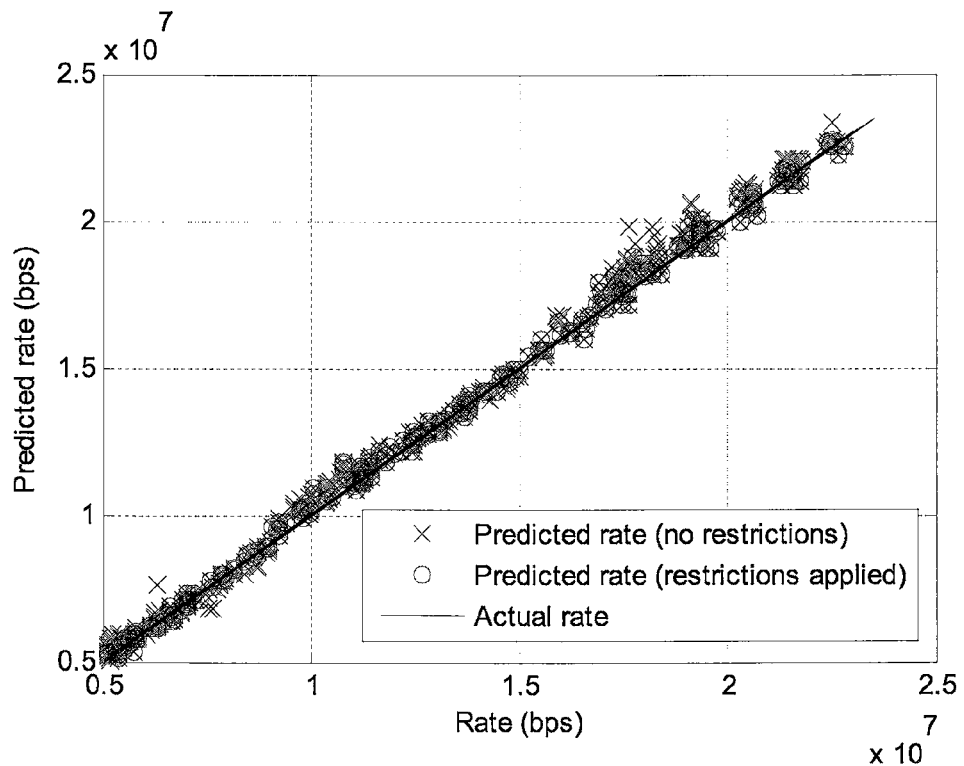
FIG. 13 is a diagram illustrating an actual bit rate and a predicted bit rate with and without restrictions on selection of candidate configuration, according to an embodiment.

The issue of the variable number of loaded carriers becomes less critical if the difference between the current and candidate settings is restricted to a maximum value for each parameter. For example, in FIG. 13, two scenarios are compared: one scenario where the change in settings are restricted to at most 6 dB for the margin and 2 symbols for the INP; and another scenario with no restrictions on line configuration changes.

As can be seen from the result of this comparison, the model performs better when the changes to line settings are restricted, and thus smoother. Table 3 comprises the error figures for these two scenarios. The relative error falls from 2.6% to 2.1% when restrictions are applied, suggesting that in practical situations, the model can offer an approximately accurate estimate, especially when considering that the maximum actual data rate varied around 1% even between experiments sharing the same configuration and line conditions.

TABLE 3

Model error for restricted and non-restricted scenarios.

| Scenario | RMSE (kpbs) | Relative Error |
| --- | --- | --- |
| With no restrictions | 298.73 | 2.56% |
| Margin and INP difference restricted | 237.70 | 2.07% |

Upstream Rate Prediction

For a typical DSLAM it is possible to read out the SNR per subcarrier for the upstream. Having access to the coding gain table 1, it is possible to analyze the bit allocation for each carrier individually, and hence get an improved rate prediction. It should be noted that a similar approach can be used to improve the downstream rate prediction if downstream SNR per subcarrier is available. The bit allocation $b_k$ can be calculated as:

$$b_k = \min\left(\left\lfloor \log_2\left(\frac{SNR_k \cdot \gamma_c}{\Gamma(P_e) \cdot \gamma_m} + 1\right)\right\rfloor, 15\right) \quad (24)$$

Figure 14:
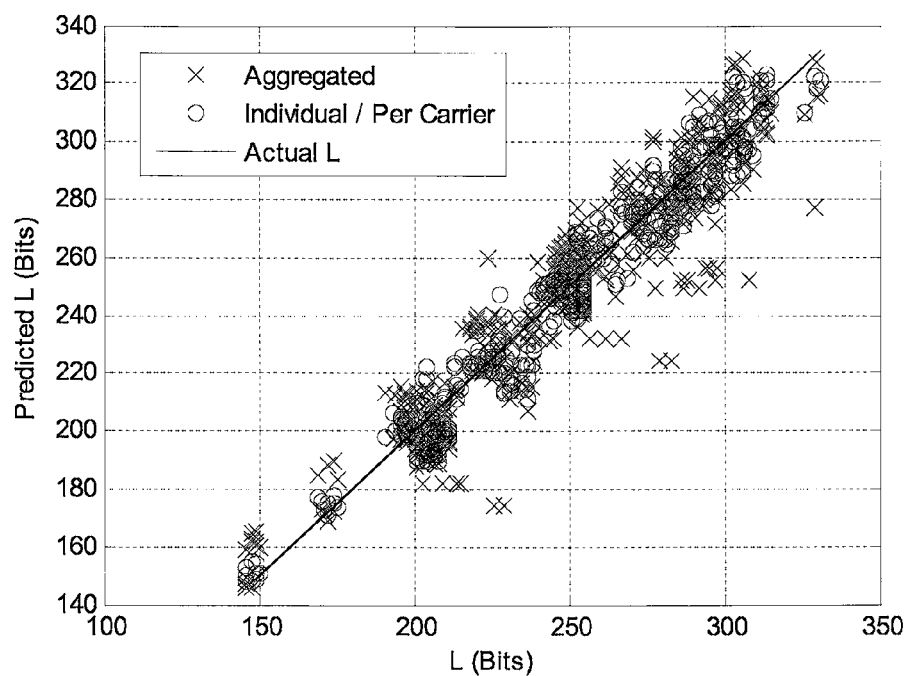
FIG. 14 is a diagram illustrating a predicted DMT symbol length L, using aggregated and per carrier bit loading, according to an embodiment.

This allows for a slightly different approach than the one used for the downstream. In this case the premise is that the SNR remains constant for each carrier between two different synchronizations in a row, while the previous model considers the whole term $$\log_2\left(\prod_{k=1}^{NSC-1} \frac{SNR_k}{\Gamma(Pe)}\right)$$

to be constant. A comparison between the two approaches regarding DMT symbol size prediction can be seen in FIG. 14; RMSE (root mean squared error) and relative error for these models are found in table 4 below.

TABLE 4

Model error for aggregated and per-carrier calculation in L prediction.

| Model | RMSE (bits) | Relative Error |
|---|---|---|
| Considering aggregate SNR constant | 11.067 | 3.52% |
| SNR constant per subcarrier | 9.906 | 3.38% |

Figure 15:
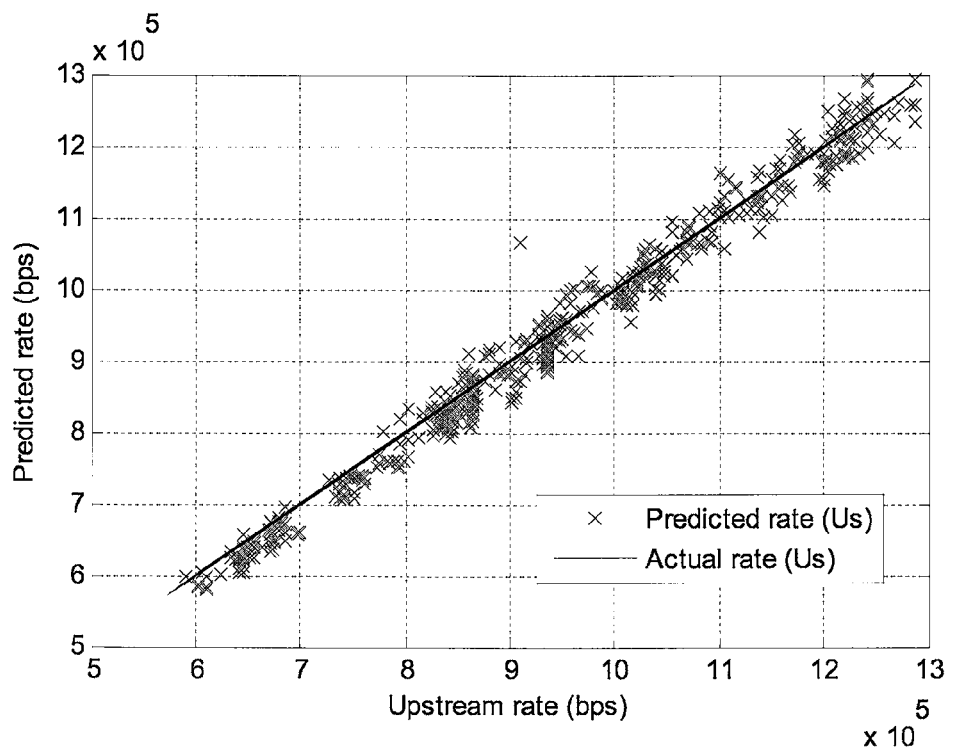
FIG. 15 is a diagram illustrating a predicted and actual upstream bit rate, not including limited-L cases, according to an embodiment.

An upstream data rate Dr may be predicted by combining the per-carrier estimation with the previously described algorithms for beta prediction. FIG. 15 shows the rate prediction for this scenario.

Figure 16:
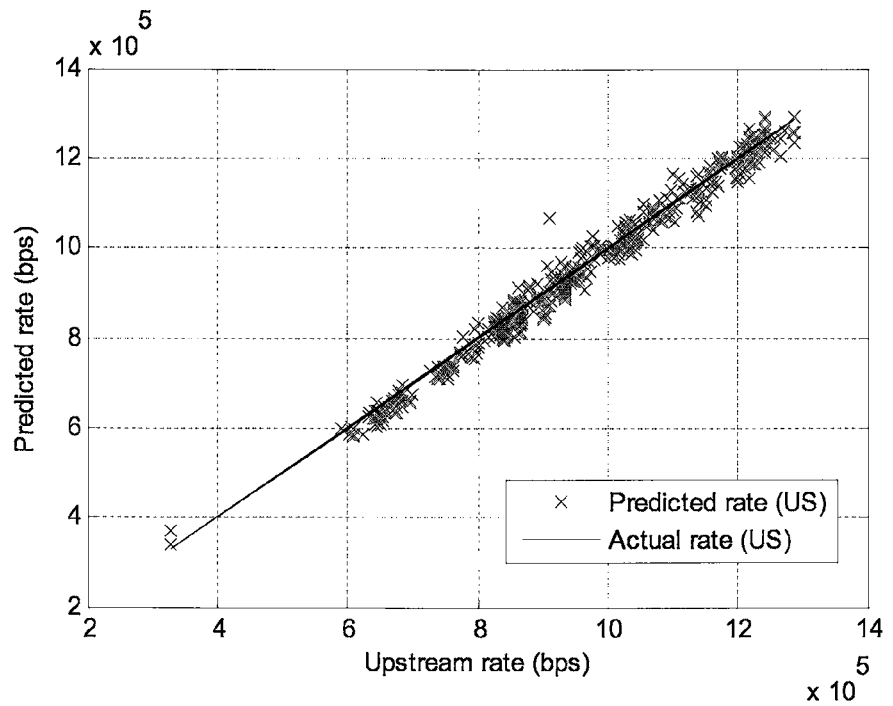
FIG. 16 is a diagram illustrating a predicted and actual upstream bit rate, including limited-L cases, according to an embodiment.

The model achieves a relative error of 3.34%, which is to the greater part inherited from the prediction of L. The prediction of L does not include experiments in which L could be exactly estimated, such as the ones limited by the INP settings. When including said cases, in which the sum of bits reaches the INP-imposed limit, the overall prediction accuracy is slightly improved, reaching a relative error of 3%. However, this is due to that it is much easier to make an exact prediction when the number of bits have reached the maximum allowed number, and is therefore not a very realistic measure of the accuracy of the prediction model. A graph showing the model results when including cases limited by the INP settings can be seen in FIG. 16.

Figure 17:
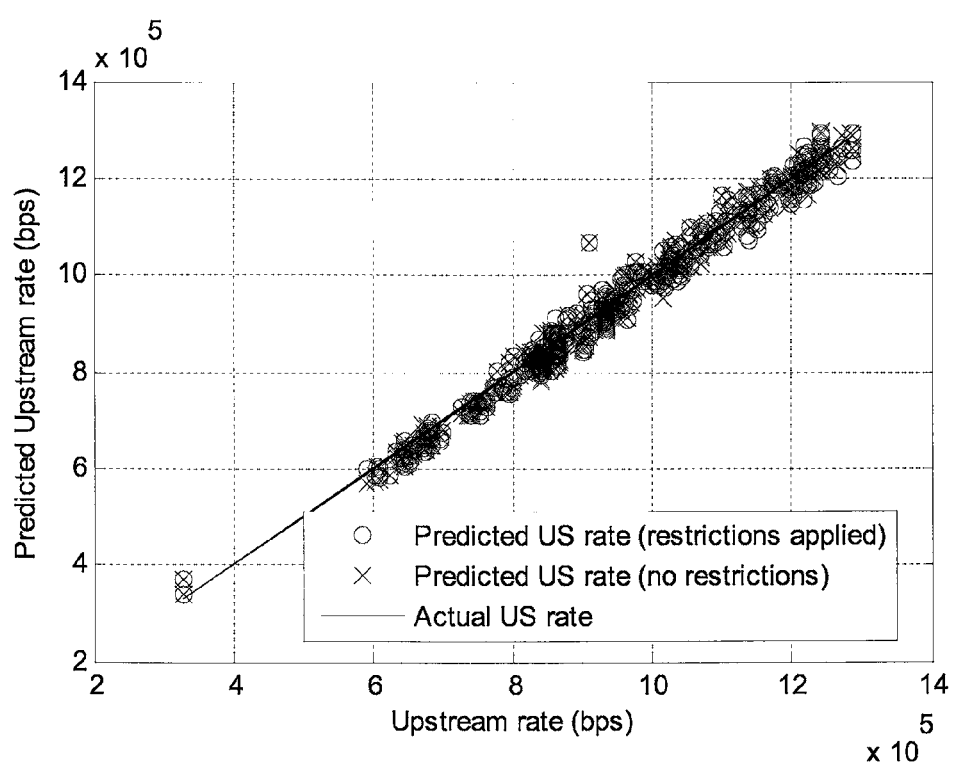
FIG. 17 is a diagram illustrating an actual upstream bit rate and a predicted upstream bit rate with and without restrictions on selection of candidate configuration, according to an embodiment.

As for the downstream case, changes in settings can be limited. For example, the changes could be restricted to at most 6 dB for the SNR margin and 1 symbol for the INP. FIG. 17 shows a graph of a comparison between a restricted scenario and a scenario where no restrictions are imposed; accuracy data can be found in Table 5. As the model works on a per-subcarrier basis, fewer assumptions were made regarding the number of tones used, and thus the change in SNR margin seems to have little influence on the accuracy, which is different from the downstream case, where a change in SNR margin could make the actual number of carriers differ significantly. Moreover, for most cases with an INPmin equal to or greater than 2, the symbol length L was limited, and therefore, a maximum difference of 2 symbols for the INP in such cases would have little influence on model accuracy.

TABLE 5

Model error for restricted and non-restricted UpStream scenarios.

| Scenario | RMSE (kpbs) | Relative Error |
|---|---|---|
| With no restrictions | 21.059 | 2.99% |
| Margin and INP difference restricted | 21.062 | 2.97% |

Figure 4:
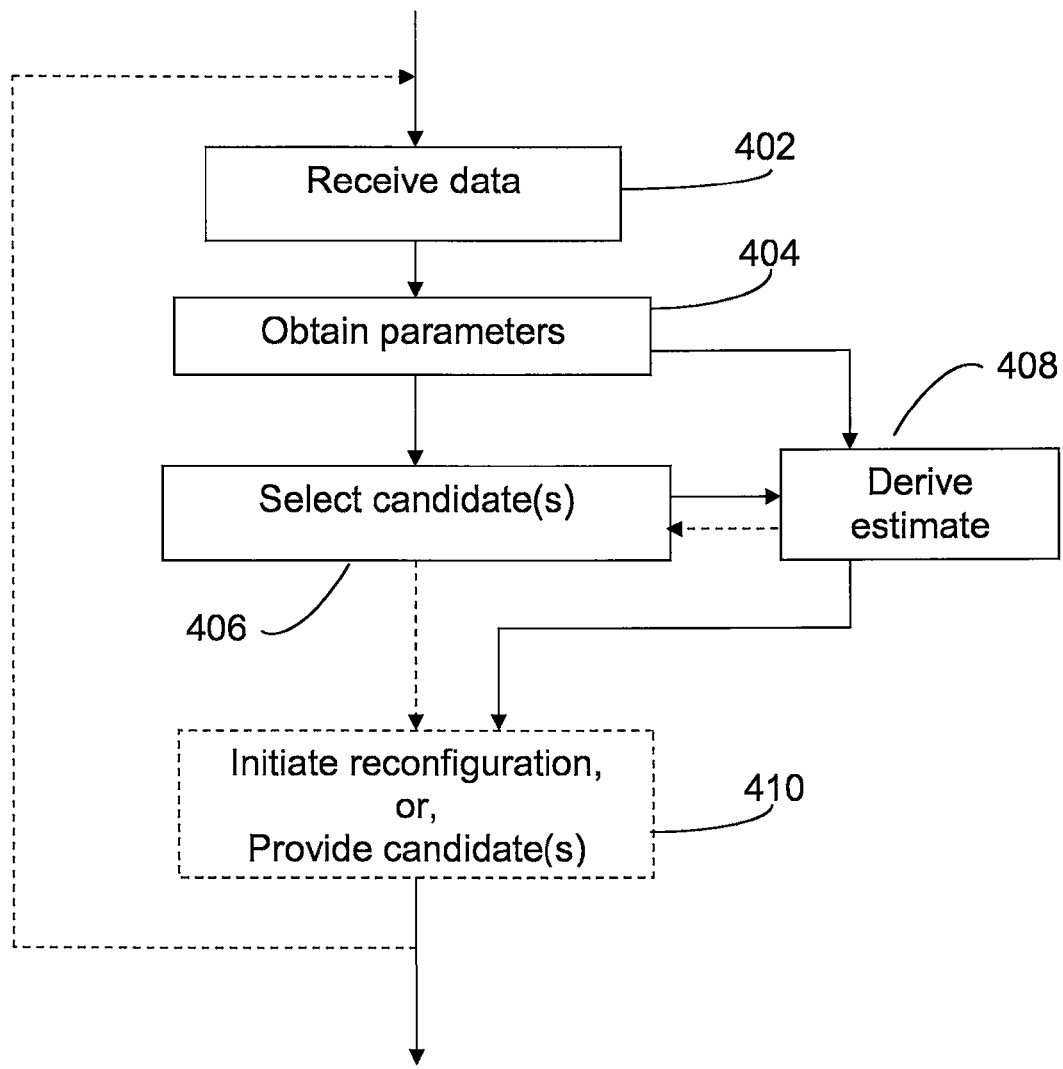
FIG. 4 is a flow chart illustrating procedure steps, according to an embodiment.

Exemplary Procedure in Network Node, FIG. 4

Below, an exemplary procedure of predicting a parameter related to an achievable bit rate, according to one embodiment, will be described with reference to FIG. 4. Initially, data is received in a step 402. The data could comprise e.g. indications of a degradation of line conditions. Then, parameters associated with a known configuration are obtained in a next step 404. The obtained parameters are the DMT symbol size, Li; an SNR margin; and an INP parameter, or value, where the SNR margin may be one of a target SNR margin and an actual SNR margin, and the INP parameter may be one of a minimum INP, INPmin_i and an actual INP, INPact_i. Using the actual values provides better results when there is a difference between the values used for configuration and the actual values. The known configuration would typically be the current configuration. In a next step 406, a candidate for a next line configuration is selected, e.g. from amongst a set of predefined candidate configuration profiles. The selected candidate configuration involves new, i.e. which differs from the values associated with the known configuration, values of at least one of the target SNR margin and the INPmin. Then, an estimate of at least one parameter indicative of the achievable bit rate, or data rate, when using the selected candidate configuration, is derived in a next step 408. This parameter may be a parameter indicative of the estimated DMT symbol size or the achievable bit rate, but also, e.g. the estimated DMT symbol size itself, or the redundancy and the bit rate itself. When only one candidate configuration is to be evaluated, the procedure ends here with the estimated parameter indicative of, or related to, the achievable bit rate.

The selection of a candidate(s) may be performed in many different ways, e.g. according to the method described in [6], and the estimated parameter indicative of the achievable bit rate may be used in different ways. The above described procedure may be used in line optimization methods as e.g. the ones described in [6]-[7], for assisting the selection of an "optimal" next line configuration. The first candidate configuration which is determined to fulfill the rate or line quality requirements may e.g. be selected as the next line configuration. Alternatively, several different candidate configurations may be evaluated, and the candidate which is found to provide the best results in terms of bit rate may be selected as the next line configuration, i.e. after evaluating all candidates.

Alternatively, the estimates derived in step 408 may be ranked, and a list indicating the ranking of the different candidates be provided to an entity which is to decide which of the evaluated candidate configurations that is to be used as the next configuration. Such a list, or ranking, may e.g. start with the candidate configuration predicted to have the highest achievable bit rate, and end with the candidate configuration predicted to have the lowest achievable bit rate. In FIG. 4, the parts associated with use e.g. in line optimization is illustrated by a dashed step 410, and dashed arrows connecting the different steps.

Figure 5:
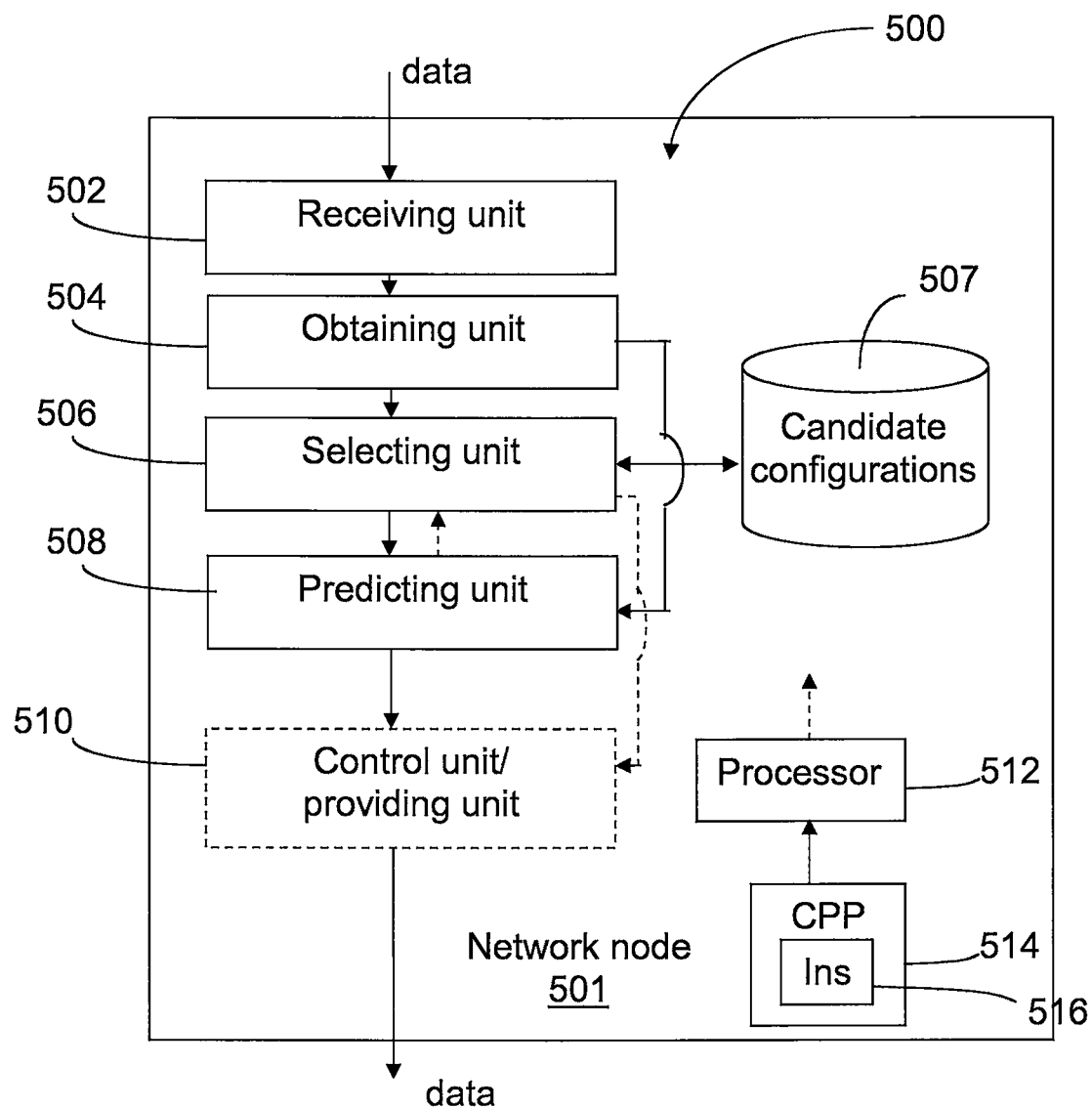
FIG. 5 is a block diagram illustrating an arrangement, according to an embodiment.

Exemplary Arrangement in Network Node, FIG. 5

Below, an exemplary arrangement 500, adapted to enable the performance of the above described procedure in a network node, will be described with reference to FIG. 10. The arrangement 500 comprises a receiving unit 502, which is adapted to receive data comprising, e.g., indications of a degradation of line conditions. The arrangement 500 further comprises an obtaining unit 504, adapted to obtain parameters associated with a known configuration. If the arrangement is connected to a DSL line in use, the known configuration would typically be the current configuration. The parameters which are obtained are the DMT symbol size, Li; an SNR margin; and an INP parameter, or value, where the SNR margin may be one of a target SNR margin and an actual SNR margin, and the INP parameter may be one of a minimum INP, INPmin_i and an actual INP value, INPact_i. The target SNR margin and INPmin could be obtained e.g. from the configuration profile used when synchronizing the line, and the actual values and the DMT symbol size could be obtained from equipment monitoring the DSL line and/or from a modem.

The arrangement 500 further comprises an selecting unit 506, adapted to select, or provide, at least one candidate configuration, for which it is desired to estimate a parameter indicative of the bit rate, or the bit rate itself. The candidate configuration involves a new value for at least one of the target SNR margin and the INPmin, and may be selected from e.g. a set 507 of predefined candidate configurations. Alternatively, the candidate configuration(s) may be provided to the selecting unit e.g. via a management interface, e.g. as the one specified in ITU-T G997.1 (International Telecommunication Union-Telecommunication Standardization Sector).

The arrangement 500 further comprises a predicting unit 508, adapted to derive an estimated parameter indicative of at least one of the DMT symbol size Li+1 and the achievable bit rate, Dr_i+1, based on the obtained parameters and the at least one selected candidate for target SNR margin, γm_i+1, and INPmin_i+1. The predicting unit 508 may further be adapted to derive e.g. the DMT symbol size Li+1 itself, the estimated redundancy β and the achievable bit rate Dr_i+1 itself.

The arrangement 500 may be used in the context of line optimization, e.g. in an arrangement for line optimization according to e.g. [6] or [7]. The selecting unit 506 and the predicting unit 508 could then further be adapted to evaluate a number of different candidate configurations, and arrange the result in different ways. For example, the achievable bit rate of the candidate configurations, which are empirically tried in e.g. [6], could instead be estimated before deciding which candidate that should be used for a next configuration. A "best candidate" could be selected from the number of evaluated candidate configuration, by selecting e.g. the candidate which has the highest predicted achievable bit rate. The "best candidate" could then be used by a control unit 510, adapted to initiate a reconfiguration, for reconfiguring, or resynchronizing, the line.

The selecting unit 506 and/or the predicting unit 508 could further be adapted to compose e.g. a list of preferred candidates, which list could be provided to another entity, for use in selecting a next configuration, by a providing unit 510, adapted to provide indications and/or information concerning one or more candidate configurations to other entities. The dashed line around unit 510, and the dashed arrows to and from unit 506 provided to indicate association with use e.g. in line optimization.

In FIG. 5 is also illustrated a computer program product (CPP) 514 which comprises instructions 516, which when executed by a processor 512, or similar, will cause the units 502-510 to perform their tasks according to any of the above described embodiments of the described procedure. Connections between the processor 512 and the units 502-510 are schematically illustrated by a dashed arrow from 512.

It should be noted that FIG. 5 merely illustrates various functional units of the arrangement 500 in a logical sense. The functional units could also be denoted e.g. "modules" or "circuits", or be e.g. parts of modules or circuits. However, the skilled person is free to implement these functions in practice using any suitable software and/or hardware means, such as e.g. ASICs (Application-Specific Integrated Circuit), FPGAs (Field-Programmable Gate Array) and DSPs (Digital Signal Processor). The arrangement 500 can be implemented e.g. as a software module, running on e.g. a PC with network access connecting it to the nodes in a DSL system. Monitoring could be implemented e.g. using the SNMP (Simple Network Management Protocol) protocol to read equipment data. Alternatively, the arrangement 500 could be implemented as a module within a DSL node. Thus, the invention is generally not limited to the shown structure of the arrangement 500 in FIG. 5.

Remarks for VDSL2

For applying the present invention to VDSL2 [10], a few minor changes are required. The VDSL2 standard specifies the possibility of choosing different profiles for the modulation scheme which determine the number of carriers and symbol duration (and therefore symbol frequency); hence the formulas need to be adapted to consider this. Formula (1) when adapted becomes:

$$Dr_{vdsl2} = F_p \times L \times (1-\beta) [kbps] \quad (25)$$

Where $F_p$ is the DMT symbol frequency rate for the profile p. Formulas that refer to the number of carriers NSC should use instead $NSC_p$, for example formula (6) adapted below:

$$L_i - L_{i+1} \cong (NSC_p - 1) \times \log_2\left(\frac{\gamma_{c_i}}{\gamma_{c_{i+1}}}\right) + (NSC_p - 1) \times \log_2\left(\frac{\gamma_{m_{i+1}}}{\gamma_m}\right) [bits] \quad (26)$$

Where $NSC_p$ is the number of carriers being used from the set of carriers established by the VDSL2 profile chosen.

The verification in the Algorithm 1, which determines whether given values of R, D and L achieve the minimum INP must be reviewed, since VDSL2 employs an interleaver block size I that can differ from the size of the FEC block N. The minimum INP constraint for a single latency path in VDSL2 is given by:

$$\frac{4 \times R \times D}{L \times q} \geq INP_{min,vdsl2} [\text{symbols}] \quad (27)$$

Where q is the ratio between the FEC and Interleaver blocks' sizes, q=N/I. Since the algorithm does not consider the parameter I, a simple way to adapt it for VDSL2 is by considering that I will always match N and therefore parameter selection will mimic the ADSL2+ procedure.

Another change is required in Algorithm 2, which calculates the Reed-Solomon parameter N, since some of the constraints on the framing parameters of the VDSL2 standard differ slightly from the ones imposed by ADSL2/+. Specifically, the values acceptable for the parameter S—which restricts valid values for N—must be set according to the profile chosen following VDSL2 Amendment 1, Table 6-1 in [11].

Final Remarks

An exemplary advantage of the above embodiments, when employed in a line optimization process, is reducing the need for service interruption for testing new line settings. In such a scenario, the invention allows the optimization to take place during regular service usage hours, since service interruption is reduced, while many previous solutions, due the excessive downtime caused by the need to probe the line, are required to run during periods of minor service usage, e.g., overnight.

Another advantage is that the invention utilizes prediction and estimation models derived from standards with high accuracy, around 95%, which permits a very accurate optimization, yielding nearly optimal settings with one single service interruption.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. The invention has mainly been exemplified using ADSL terminology. However, the invention could also be applied in similar systems, such as e.g. VDSL2. The mathematical formulas presented herein may be slightly varied or reformulated in a number of ways and still express the same underlying relations between the concerned parameters. Such variations and reformulations are considered to be within the scope of the invention. The invention is generally defined by the following independent claims.

REFERENCES

[1] Golden, P., Dedieu, H., Jacobsen, K. S. (editors), "Fundamentals of DSL Technology", Auerbach Publications, 2006.
[2] ITU-T Recommendation G992.1, "Asymmetric Digital Subscriber Line Transceivers (ADSL), Digital Section and Digital Line System—Access Networks", July 1999.
[3] ITU Recommendation G.992.3: "Asymmetric digital subscriber line transceivers 2 (ADSL2)", January 2005.
[4] ITU Recommendation G.992.5: "Asymmetric Digital Subscriber Line (ADSL) transceivers—Extended bandwidth ADSL2 (ADSL2plus)", January 2005.
[5] ITU Recommendation G.992.5: Amendment 1, July 2005.
[6] Trojer, Elmar. "Arrangement and Method of Configuring Digital Subscriber Lines", U.S. Patent Application 2009/0175199, filed in Apr. 13, 2006.
[7] Cioffi et al, "DSL System Estimation and Parameter Recommendation", U.S. Pat. No. 7,302,379 B2, filed Apr. 2, 2004, Date of patent: Nov. 27, 2007.
[8] Lusky et al., "Channel Monitoring for Improved Parameter Selection in a Communication System", U.S. Pat. No. 7,315,573 B2, filed Oct. 18, 2002, date of patent Jan. 1, 2008.
[9] Christensen, J. M., and Jensen, B. S., "Optimizing Bandwidth of DSL Connections", U.S. Pat. No. 7,035,249 B2, filed Mar. 28, 2001, date of patent Apr. 25, 2006.
[10] ITU-T Recommendation G.993.2: "Very high speed digital subscriber line transceivers 2 (VDSL2)", February 2007.
[11] ITU-T Recommendation G.993.2: "Very high speed digital subscriber line transceivers 2 (VDSL2)—Amendment 1", April 2007.

The invention claimed is:

1. A method for predicting a parameter indicative of an achievable bit rate when using a certain configuration in a digital subscriber line, the method comprising:
obtaining the following parameters, associated with a known configuration Ci: a Discrete Multi-Tone modulation (DMT) symbol size (Li), a Signal-to-Noise Ratio (SNR) margin, and a first Impulse Noise Protection (INP) parameter associated with a predefined coding gain value γc, where the SNR margin is one of a target SNR margin and an actual SNR margin, and the first INP parameter is one of (a) a minimum INP (INPmin_i) and (b) an actual INP (INPact_i);
selecting a new candidate configuration Ci+1 associated with a target SNR margin (γm_i+1) and a second INP parameter (INPmin_i+1), where the INPmin_i+1 value is associated with a predefined coding gain value γc_i+1;
and deriving an estimated parameter indicative of at least one of the DMT symbol size Li+1 and the achievable bit rate (Dr_i+1) based on: the obtained parameters, the target SNR margin γm_i+1 of the candidate configuration, and the coding gain value γc_i+1 associated with the second INP parameter INPmin_i+1 of the candidate configuration, thus enabling estimation of the achievable bit rate, Dr_i+1, of the candidate configuration, wherein
an estimated DMT symbol size L for a certain configuration is calculated based on the parameters: NSC, γc, γm, SNRk and Pe, where NSC is the number of subcarriers on the line, γc is the coding gain associated with the minimum or actual INP value of the configuration, γm is the target or actual SNR margin of the line, SNRk is the SNR for subcarrier no. k, and Pe is the desired bit error probability, and the DMT symbol size L for a certain configuration is estimated as:

$$L \cong (NSC-1) \times \log_2(\gamma_c) - (NSC-1) \times \log_2(\gamma_m) + \log_2\left(\prod_{k=1}^{NSC-1} \frac{SNR_k}{\Gamma(Pe)}\right),$$

where
Γ(Pe) is the Shannon gap for the desired bit error probability Pe, and, wherein L should fall within the constraint:

$$L \leq \frac{4 \times R \times D}{INP_{min}}$$

where R is the redundancy per Forward Error Correction codeword, and D is the interleaver depth.

2. The method according to claim 1, wherein the estimated parameter is one of the DMT symbol size Li+1 and the achievable bit rate, Dr_i+1.

3. The method according to claim 1, wherein an estimated difference in DMT symbol size between a configuration Ci and a configuration Ci+1 is calculated based on the parameters NSC, γc_i, γc_i+1, γm_i and γm_i+1, where NSC is the number of subcarriers on the line, γc is the coding gain associated with the minimum or actual INP of a configuration, and γm is the target or actual SNR margin of the line for a configuration.

4. The method according to claim 1, wherein a forward error correction (FEC) block length N, a redundancy R and an interleaver depth D of a candidate configuration profile are estimated by emulating modem behaviour by applying a heuristic process taking the DMT symbol length Li+1, INPmin and maxDelay as input, where the INPmin and maxDelay are obtained from the candidate configuration Ci+1.

5. The method according to claim 4, wherein one goal of the heuristic process is set to minimizing the interleaver depth D.

6. The method according to claim 1, wherein the method is used in a process of adapting a line configuration to current line conditions, wherein the method further comprises:
obtaining information concerning current line conditions, and
determining whether the candidate line configuration fulfils certain requirements for use as a next line configuration, based on at least one of a predicted DMT symbol length and a predicted achievable bit rate.

7. The method according to claim 6, wherein the information concerning line conditions relates to at least one of current line conditions and historic line conditions.

8. The method according to claim 1, further comprising:
ranking different candidate configurations, based on at least one of a predicted DMT symbol length and a predicted achievable bit rate.

9. The method according to claim 1, further comprising the step of providing information concerning at least one suitable, in terms of predicted achievable bit rate, candidate configuration to a unit, which is to perform a line reconfiguration based on said information.

10. The method according to claim 1, further comprising the step of selecting a suitable, in terms of predicted achievable bit rate, candidate configuration, and reconfiguring the line based on said selected candidate configuration.

11. The method according to claim 1, wherein the method is used in the selection of a next line configuration in a process of adapting a line configuration to current line conditions.

12. An arrangement adapted to perform the method according to claim 1.

13. A method for predicting a parameter indicative of an achievable bit rate when using a certain configuration in a digital subscriber line, the method comprising:
   obtaining the following parameters, associated with a known configuration Ci: a Discrete Multi-Tone modulation (DMT) symbol size (Li), a Signal-to-Noise Ratio (SNR) margin, and a first Impulse Noise Protection (INP) parameter associated with a predefined coding gain value γc, where the SNR margin is one of a target SNR margin and an actual SNR margin, and the first INP parameter is one of (a) a minimum INP (INPmin_i) and (b) an actual INP (INPact_i);
   selecting a new candidate configuration Ci+1 associated with a target SNR margin (γm_i+1) and a second INP parameter (INPmin_i+1), where the INPmin_i+1 value is associated with a predefined coding gain value γc_i+1; and
   deriving an estimated parameter indicative of at least one of the DMT symbol size Li+1 and the achievable bit rate, Dr_i+1, based on: the obtained parameters, the target SNR margin γm_i+1 of the candidate configuration, and the coding gain value γc_i+1 associated with the second INP parameter INPmin_i+1 of the candidate configuration, thus enabling estimation of the achievable bit rate, Dr_i+1, of the candidate configuration, wherein
   an estimated difference in DMT symbol size between a configuration Ci and a configuration Ci+1 is calculated based on the parameters NSC, γc_i, γc_i+1, γm_i and γm_i+1, where NSC is the number of subcarriers on the line, γc is the coding gain associated with the minimum or actual INP of a configuration, and γm is the target or actual SNR margin of the line for a configuration, and
   the difference in DMT symbol size between a configuration Ci and a configuration Ci+l is estimated as:

$$L_i - L_{i+1} \cong (NSC-1) \times \log_2\left(\frac{\gamma_c}{\gamma_{c_{i+1}}}\right) + (NSC-1) \times \log_2\left(\frac{\gamma_{m_{i+1}}}{\gamma_m}\right) [\text{bits}].$$

14. A method for predicting a parameter indicative of an achievable bit rate when using a certain configuration in a digital subscriber line, the method comprising:
   obtaining the following parameters, associated with a known configuration Ci: a Discrete Multi-Tone modulation (DMT) symbol size (Li), a Signal-to-Noise Ratio (SNR) margin, and a first Impulse Noise Protection (INP) parameter associated with a predefined coding gain value γc, where the SNR margin is one of a target SNR margin and an actual SNR margin, and the first INP parameter is one of (a) a minimum INP (INPmin_i) and (b) an actual INP (INPact_i);
   selecting a new candidate configuration Ci+1 associated with a target SNR margin (γm_i+1) and a second INP parameter (INPmin_i+1), where the INPmin_i+1 value is associated with a predefined coding gain value γc_i+1; and
   deriving an estimated parameter indicative of at least one of the DMT symbol size Li+1 and the achievable bit rate, Dr_i+1, based on: the obtained parameters, the target SNR margin γm_i+1 of the candidate configuration, and the coding gain value γc_i+1 associated with the second INP parameter INPmin_i+1 of the candidate configuration, thus enabling estimation of the achievable bit rate, Dr_i+1, of the candidate configuration, wherein a predicted achievable bit rate Dri+1 when using a certain configuration Ci+1 is calculated based on the parameters Sr, Li+1 and β, where Sr is the symbol rate; Li+1 is the DMT symbol size, and β is the redundancy ratio, R/N, where R is the redundancy per Forward Error Correction codeword; and N is the length of the Forward Error Correction codewords.

15. A method for predicting a parameter indicative of an achievable bit rate when using a certain configuration in a digital subscriber line, the method comprising:
   obtaining the following parameters, associated with a known configuration Ci: a Discrete Multi-Tone modulation (DMT) symbol size (Li), a Signal-to-Noise Ratio (SNR) margin, and a first Impulse Noise Protection (INP) parameter associated with a predefined coding gain value γc, where the SNR margin is one of a target SNR margin and an actual SNR margin, and the first INP parameter is one of (a) a minimum NP (INPmin_i) and (b) an actual INP (INPact_i);
   selecting a new candidate configuration Ci+1 associated with a target SNR margin (γm_i+1) and a second INP parameter (INPmin_i+1), where the INPmin_i+1 value is associated with a predefined coding gain value γc_i+1; and
   deriving an estimated parameter indicative of at least one of the DMT symbol size Li+1 and the achievable bit rate, Dr_i+1 based on: the obtained parameters, the tar et SNR margin γm_i+1 of the candidate configuration, and the coding gain value γc_i+1 associated with the second INP parameter INPmin_i+1 of the candidate configuration, thus enabling estimation of the achievable bit rate, Dr_i+1, of the candidate configuration, wherein the achievable bit rate Dri+1 when using a certain configuration Ci+1 is estimated approximately as: Dr_i+1=Sr·Li+1·(1−βi+1), where Dr is the bit rate; Sr is the symbol rate; and β is the redundancy ratio, R/N, where R is the redundancy per Forward Error Correction codeword; and N is the length of the Forward Error Correction codewords.

16. An apparatus adapted to predict a parameter indicative of an achievable bit rate when using a certain configuration in a digital subscriber line, the apparatus comprising:
   a memory; and
   a processor, the processor being adapted to:
   obtain the following parameters, associated with a known configuration Ci: a Discrete Multi-Tone modulation (DMT) symbol size (Li), a Signal-to-Noise Ratio (SNR) margin, and an impulse Noise Protection (INP) parameter, where the SNR margin is one of a target SNR margin and an actual SNR margin, and the INP parameter is one of a minimum INP (INPmin_i) and an actual INP (INPact_i);
   select a new candidate configuration Ci+1, associated with a target SNR margin γm_i+1 and a second INP parameter (INPmin_i+1), where the INPmin_i+1 value is associated with a predefined coding gain value γc_i+1;
   derive a respective coding gain value γc associated with each obtained or selected INP value, and further adapted to derive an estimated parameter indicative of at least one of the DMT symbol size Li+1 and the achievable bit rate (Dr_i+1) based on the obtained parameters and the target SNR margin, γm_i+1 of the candidate configuration, and the coding gain value γc_i+1, associated with INPmin_i+1 of the candidate configuration;

calculate an estimated DMT symbol size L for a certain configuration based on the parameters: NSC, γc, γm, SNRk and Pe, where NSC is the number of subcarriers on the line, γc is the coding gain associated with the minimum or actual INP value of the configuration, γm is the target or actual SNR margin of the line, SNRk is the SNR for subcarrier no. k, and Pe is the desired bit error probability; and estimate the DMT symbol size L for a certain configuration as:

$$L \cong (NSC - 1) \times \log_2(\gamma_c) - (NSC - 1) \times \log_2(\gamma_m) + \log_2\left(\prod_{k=1}^{NSC-1} \frac{SNR_k}{\Gamma(Pe)}\right),$$

where
Γ(Pe) is the Shannon gap for the desired bit error probability Pe, and, wherein L should fall within the constraint:

$$L \le \frac{4 \times R \times D}{INP_{min}}$$

where R is the redundancy per Forward Error Correction codeword, and D is the interleaver depth.

17. The apparatus according to claim 16, wherein the predicting unit is adapted to derive the DMT symbol size Li+1 or the achievable bit rate, Dr_i+1.

18. The apparatus according to claim 16, adapted to calculate an estimated difference in DMT symbol size between a configuration Ci and a configuration Ci+1, based on the parameters NSC, γc_i, γc_i+1, γm_i and γm_j+1,
where
NSC is the number of subcarriers on the line,
γc is the coding gain associated with the minimum or actual INP of a configuration, and
γm is the target or actual SNR margin of the line for a configuration.

19. The apparatus according to claim 18, adapted to estimate the difference in DMT symbol size between a configuration Ci and a configuration Ci+1 as:

$$L_i - L_{i+1} \cong (NSC - 1) \times \log_2\left(\frac{\gamma_{c_i}}{\gamma_{c_{i+1}}}\right) + (NSC - 1) \times \log_2\left(\frac{\gamma_{m_{i+1}}}{\gamma_m}\right)[bits]$$

20. The apparatus according to claim 16, adapted to estimate a forward error correction block length N, a redundancy R and an interleaver depth D of a candidate configuration profile by applying a heuristic process taking the DMT symbol length Li+1, INPmin and maxDelay as input, where the INPmin and maxDelay are obtained from the candidate configuration Ci+1.

21. The apparatus according to claim 20, wherein one goal of the heuristic process is set to minimizing the interleaver depth D.

22. The apparatus according to claim 16, adapted to calculate a predicted achievable bit rate Dri+1 for when using a certain configuration Ci+1, based on the parameters Sr, Li+1 and β,
where
Sr is the symbol rate;
Li+1 is the DMT symbol size, and
β is the redundancy ratio, R/N, where R is the redundancy per Forward Error Correction codeword; and N is the length of the Forward Error Correction codewords.

23. The apparatus according to claim 16 adapted to estimate the achievable bit rate Dri+1 for when using a certain configuration Ci+1 approximately as:

Dri+1=Sr·Li+1·(1−βi+1), where
Dr is the bit rate;
Sr is the symbol rate; and
β is the redundancy ratio, R/N, where R is the redundancy per Forward Error Correction codeword; and N is the length of the Forward Error Correction codewords.

24. The apparatus according to claim 16, adapted to take part in a process of adapting a line configuration to current line conditions, wherein the arrangement is further adapted to:
obtain information concerning current line conditions, and
determine whether the candidate line configuration fulfils certain requirements for use as a next line configuration, based on at least one of a predicted DMT symbol length and a predicted achievable bit rate.

25. The apparatus according to claim 24, adapted to obtain information relating to at least one of current line conditions and historic line conditions.

26. The apparatus according to claim 16, adapted to rank different candidate configurations, based on at least one of a predicted DMT symbol length and a predicted achievable bit rate.

27. The apparatus according to claim 16, adapted to provide information concerning at least one suitable, in terms of predicted achievable bit rate, candidate configuration to a unit, which is to perform a line reconfiguration based on said information.

28. The apparatus according to claim 16, adapted to select a suitable, in terms of predicted achievable bit rate, candidate configuration, and reconfiguring the line based on said selected candidate configuration.

* * * * *

UNITED STATES PATENT AND TRADEMARK OFFICE
CERTIFICATE OF CORRECTION

PATENT NO.         : 9,042,251 B2
APPLICATION NO.    : 13/638184
DATED              : May 26, 2015
INVENTOR(S)        : Berg et al.

It is certified that error appears in the above-identified patent and that said Letters Patent is hereby corrected as shown below:

In the Drawings,

In Fig. 11, Sheet 8 of 11, Line 3, delete " ¯28 256 " and insert -- 128 256 --, therefor.

In the Specification,

In Column 3, Line 61, delete "Dr_i₊1," and insert -- Dr_i+1, --, therefor.

In Column 4, Line 17, delete "Dr_i₊1." and insert -- Dr_i+1. --, therefor.

In Column 4, Line 40, delete "$Dr_{i+1}$," and insert -- $Dr_{i+1}$ --, therefor.

In Column 4, Line 43, delete "$Dr_{i+1}$," and insert -- $Dr_{i+1}$ --, therefor.

In Column 6, Line 33, delete "$INP_m$," and insert -- $INP_{min}$ --, therefor.

In Column 8, Line 54, delete "gain" and insert -- gain $\gamma_{ci+1}$ --, therefor.

In Column 8, Line 64, delete "gain" and insert -- gain $\gamma_{ci+1}$ --, therefor.

In Column 10, Line 4, delete "beta p" and insert -- beta β --, therefor.

In Column 14, Line 31, delete "(kpbs)" and insert -- (kbps) --, therefor.

In Column 15, Line 47, delete "(kpbs)" and insert -- (kbps) --, therefor.

Signed and Sealed this
Eighth Day of March, 2016

Michelle K. Lee
*Director of the United States Patent and Trademark Office*

CERTIFICATE OF CORRECTION (continued)
U.S. Pat. No. 9,042,251 B2

In the Claims,

In Column 20, Line 21, in Claim 2, delete "one of" and insert -- one of: --, therefor.

In Column 22, Line 21, in Claim 15, delete "NP" and insert -- INP --, therefor.

In Column 22, Line 30, in Claim 15, delete "Dr_i+1" and insert -- Dr_i+1, --, therefor.

In Column 22, Line 30, in Claim 15, delete "tar et" and insert -- target --, therefor.

In Column 22, Line 37, in Claim 15, delete "Dr_i+" and insert -- Dr i+ --, therefor.

In Column 23, Line 34, in Claim 18, delete "γm_j+1," and insert -- γm_i+1, --, therefor.